US012690957B2

(12) United States Patent
Buchanan et al.

(10) Patent No.: US 12,690,957 B2
(45) Date of Patent: Jul. 28, 2026

(54) VACUUM DRAWN IRRIGATION FOLLOWED BY INSTANT OBTURATION OF A ROOT CANAL SYSTEM USING A SINGLE STAGING ASSEMBLY

(71) Applicant: L. Stephen Buchanan, Santa Barbara, CA (US)

(72) Inventors: L. Stephen Buchanan, Santa Barbara, CA (US); John Baeten, Racine, WI (US); Brett Arand, Milwaukee, WI (US)

( * ) Notice: Subject to any disclaimer, the term of this patent is extended or adjusted under 35 U.S.C. 154(b) by 650 days.

(21) Appl. No.: 17/910,667

(22) PCT Filed: Mar. 10, 2021

(86) PCT No.: PCT/US2021/021798
§ 371 (c)(1),
(2) Date: Sep. 9, 2022

(87) PCT Pub. No.: WO2021/183703
PCT Pub. Date: Sep. 16, 2021

(65) Prior Publication Data
US 2023/0135573 A1      May 4, 2023

Related U.S. Application Data

(60) Provisional application No. 63/091,872, filed on Oct. 14, 2020, provisional application No. 62/987,463, filed on Mar. 10, 2020.

(51) Int. Cl.
*A61C 17/02*          (2006.01)
*A61C 5/50*           (2017.01)

(52) U.S. Cl.
CPC ............ *A61C 17/0208* (2013.01); *A61C 5/50* (2017.02)

(58) Field of Classification Search
CPC ......... A61C 17/0208; A61C 5/50; A61C 5/80; A61C 17/02
See application file for complete search history.

(56) References Cited

U.S. PATENT DOCUMENTS

| | | | | |
|---|---|---|---|---|
| 1,987,907 A | * | 1/1935 | Jenkins | A61C 17/0208 |
| | | | | 15/345 |
| 3,562,913 A | * | 2/1971 | Saffro | A61C 5/44 |
| | | | | 433/75 |
| 4,021,921 A | * | 5/1977 | Detaille | A61C 5/40 |
| | | | | 433/80 |
| 4,276,880 A | | 7/1981 | Malmin | |
| 6,971,878 B2 | | 12/2005 | Pond | |
| 8,753,121 B2 | | 6/2014 | Gharib et al. | |

(Continued)

OTHER PUBLICATIONS

Baumgartner et al, "A Scanning Electron Microscopic Evaluation of Root Canal Debridement Using Saline, Sodium Hypochlorite, and Citric Acid", , pp. 525-531, vol. 10, No. 11, Publisher: Jounral of Endodontics; Nov. 1984.

(Continued)

*Primary Examiner* — Eric J Rosen
*Assistant Examiner* — Courtney N Huynh
(74) *Attorney, Agent, or Firm* — GableGotwals

(57) ABSTRACT

Embodiments of this disclosure provide a staging assembly for negative pressure, multi-canal irrigation of a root canal system followed by obturation. The staging assembly may be part of a kit that includes a plurality of catheters sized for insertion into the root canal system. To hold the catheter in its proper position in the canal, the catheter may include a stop and the staging assembly may include a corresponding stop hold. The distal end of the catheter can be positioned 2 mm to 5 mm from the terminus end of the root canal. The staging assembly is then sealed, creating a closed system. Irrigating solution is vacuum-drawn out the ends of the catheters and debris is evacuated through a vacuum port of the stating assembly. During irrigation, no hands on time is required by the clinician. After irrigation, vacuum is reversed to dry the canal. Obturation occurs through the vacuum.

24 Claims, 14 Drawing Sheets

(56) References Cited

U.S. PATENT DOCUMENTS

| | | | |
|---|---|---|---|
| 10,779,920 B2 | 9/2020 | Buchanan | |
| 2005/0170312 A1* | 8/2005 | Pond | A61C 5/40 |
| | | | 433/81 |
| 2005/0287498 A1 | 12/2005 | Schoeffel | |
| 2006/0110710 A1 | 5/2006 | Schemmer et al. | |
| 2009/0004621 A1 | 1/2009 | Quan et al. | |
| 2010/0143862 A1* | 6/2010 | Lee | A61C 5/50 |
| | | | 433/81 |
| 2015/0173852 A1* | 6/2015 | Khakpour | A61C 17/02 |
| | | | 433/215 |
| 2018/0153644 A1 | 6/2018 | Bosisio et al. | |
| 2020/0197130 A1* | 6/2020 | Castle | A61C 1/08 |
| 2021/0121275 A1* | 4/2021 | Parham | A61C 5/40 |

OTHER PUBLICATIONS

Costerton et al, "How Bacteria Stick", W. H. Freeman and Company, , pp. 86-95, vol. 238, No. 1, Publisher: Scientific American; Jan. 1978.

Estrela et al, "Mechanism of Actioon of Sodium Hypochlorite", , pp. 113-117, vol. 13, No. 2, Publisher: Braz Dent J; 2002.

Haapasalo et al, "Inactivation of local root canal medicametns by dentine: an in vitro study", Blackwell Science ltd., , pp. 126-131, vol. 33, Publisher: International Endodontic Journal; 2000.

Haapasalo et al, "Tissue Dissolution by a Novel Multisonic Ultracleaning System and Sodium Hypochlorite", , vol. 8, Publisher: J Endo.; Aug. 2014.

Hulsmann et al, "Complications during root canal irrigation—literature review and case reports", , pp. 186-193, vol. 33, Publisher: International Endodontic Journal; 2000.

Mergoni et al, "Single versus multiple visits for endodontic treatment of permanent teeth (Review)", Issue 12, , Publisher: Cochrane Library Database of Systematic Reviews; 2016.

Nixdorf et al, "Differential Diagnoses for Persistent Pain Following Root Canal Treatment: A Study in the National Dental PBRN", , vol. 41, No. 4, Publisher: J Endod.; Apr. 2015.

Olivi et al, "Photoacoustic Endodontics using PIPS; experimental background and clinical protocol", , vol. 2012, No. 1, Publisher: Journal of the Laser and Health Academy; May 2012.

Retamozo et al, "Minimum Contact time and Concentration of Sodium Hypochlorite Required to Eliminate Enterococcus faecalis", , pp. 520-523, vol. 36, No. 5, Publisher: J Endo.; Mar. 2010.

* cited by examiner

30 Ga. Annealed SS

22 Ga. Annealed SS

30Ga. Ductile SS

22Ga. Hard SS

59

54

7mm

1mm

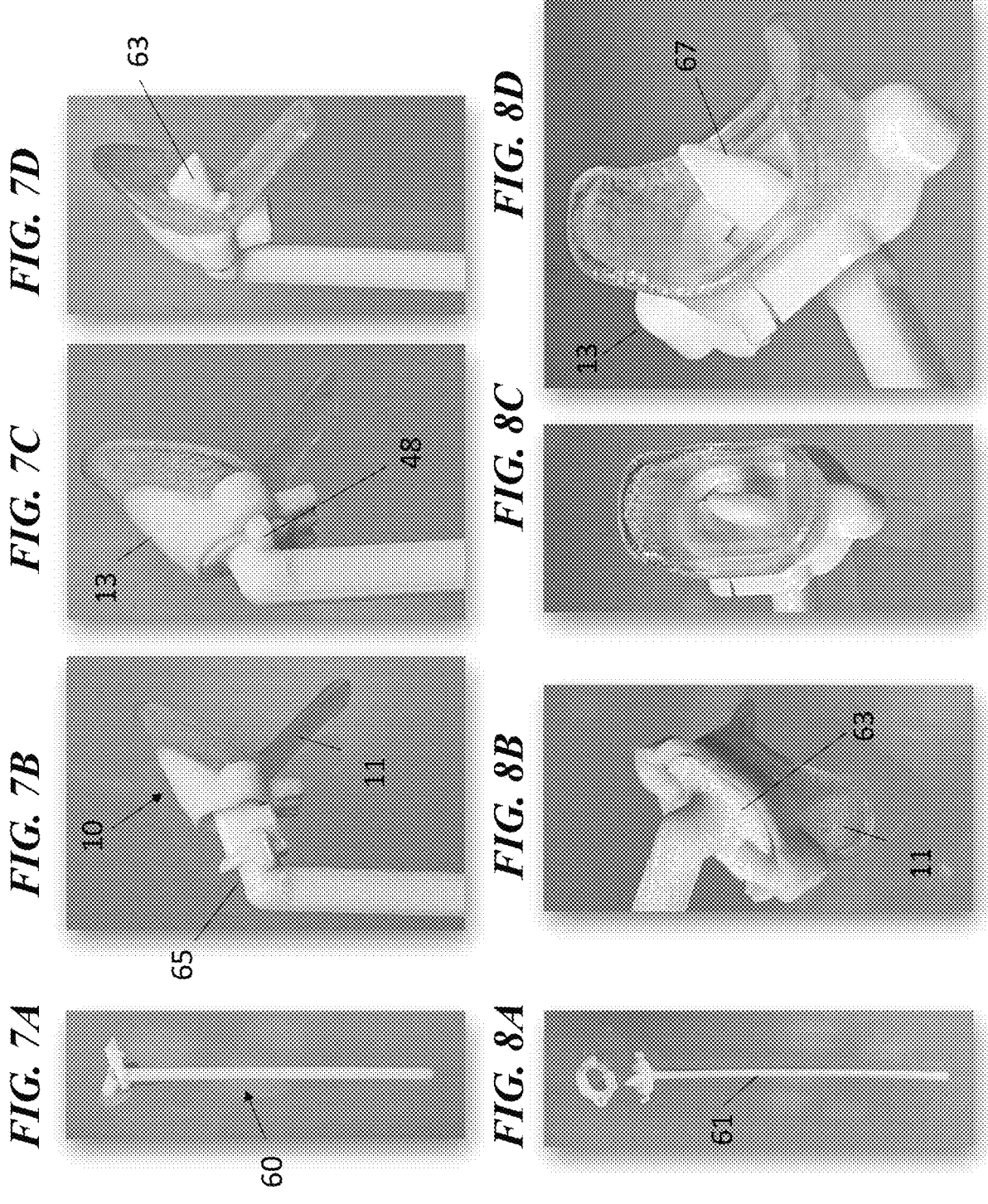

*FIG. 10A*

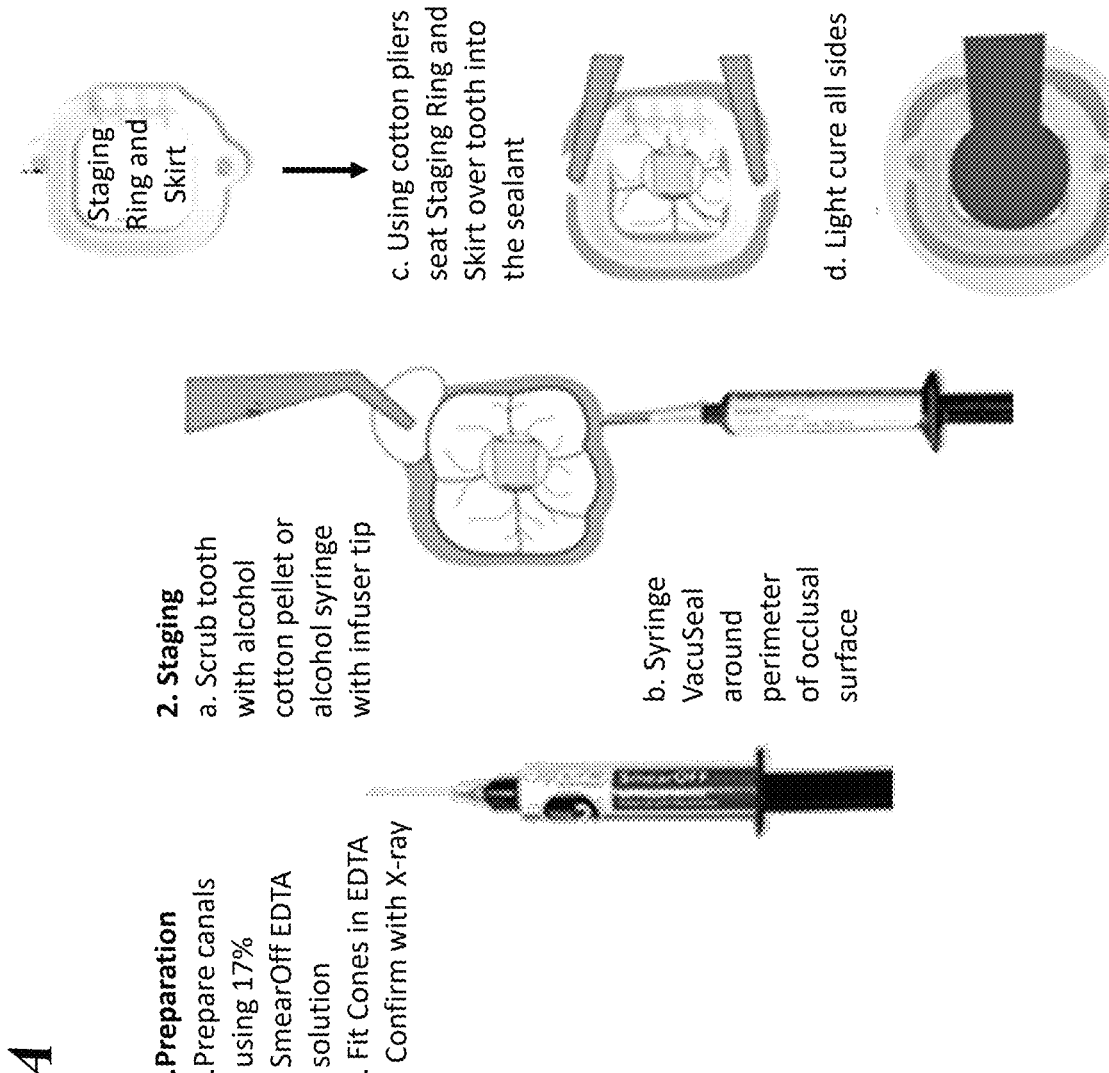

1.Preparation
a.Prepare canals using 17% SmearOff EDTA solution
b. Fit Cones in EDTA
c. Confirm with X-ray

2. Staging
a. Scrub tooth with alcohol cotton pellet or alcohol syringe with infuser tip b. Syringe VacuSeal around perimeter of occlusal surface Staging Ring and Skirt c. Using cotton pliers seat Staging Ring and Skirt over tooth into the sealant d. Light cure all sides

*FIG. 10B*

3. Catheter Placement

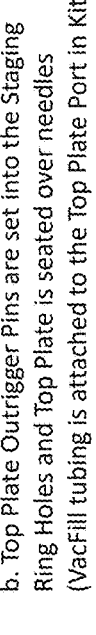

Needles, manifold 3-way valve

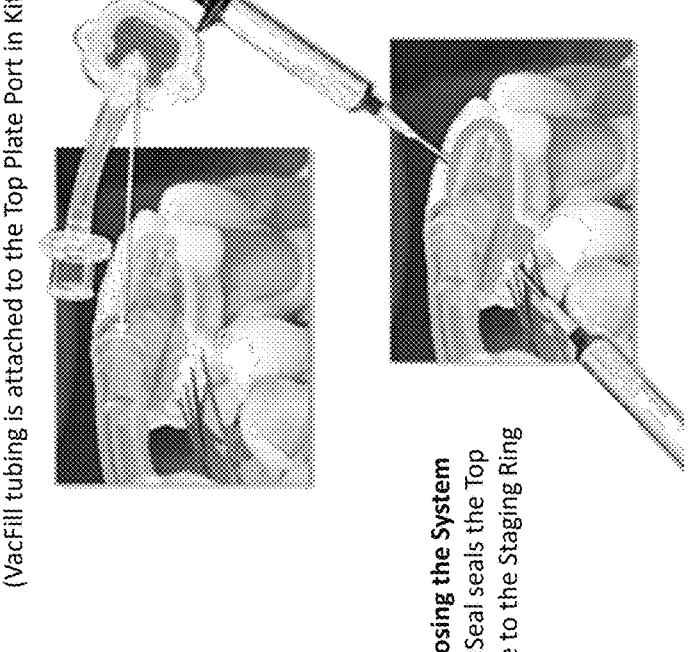

b. Top Plate Outrigger Pins are set into the Staging Ring Holes and Top Plate is seated over needles (VacFill tubing is attached to the Top Plate Port in Kit)

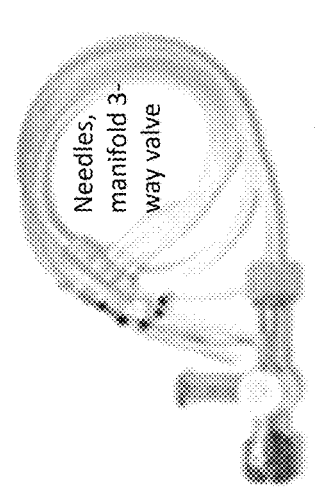

a. Catheters are placed to length into each canal, then their proximal ends are placed into needle slots in the Staging Ring Fence, binding the stops in the scalloped shapes ahead of the Fence.

4. Closing the System
VacuSeal seals the Top Plate to the Staging Ring

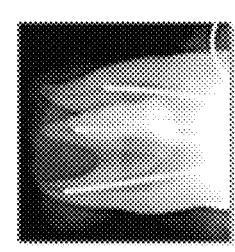

c. X-ray confirms needle position

5. Hooking up the suction
a. Attach the vacuum line to the tube from the Top Plate b. Plug the other end into your chairside vacuum system Vacuum line

*FIG. 11B*

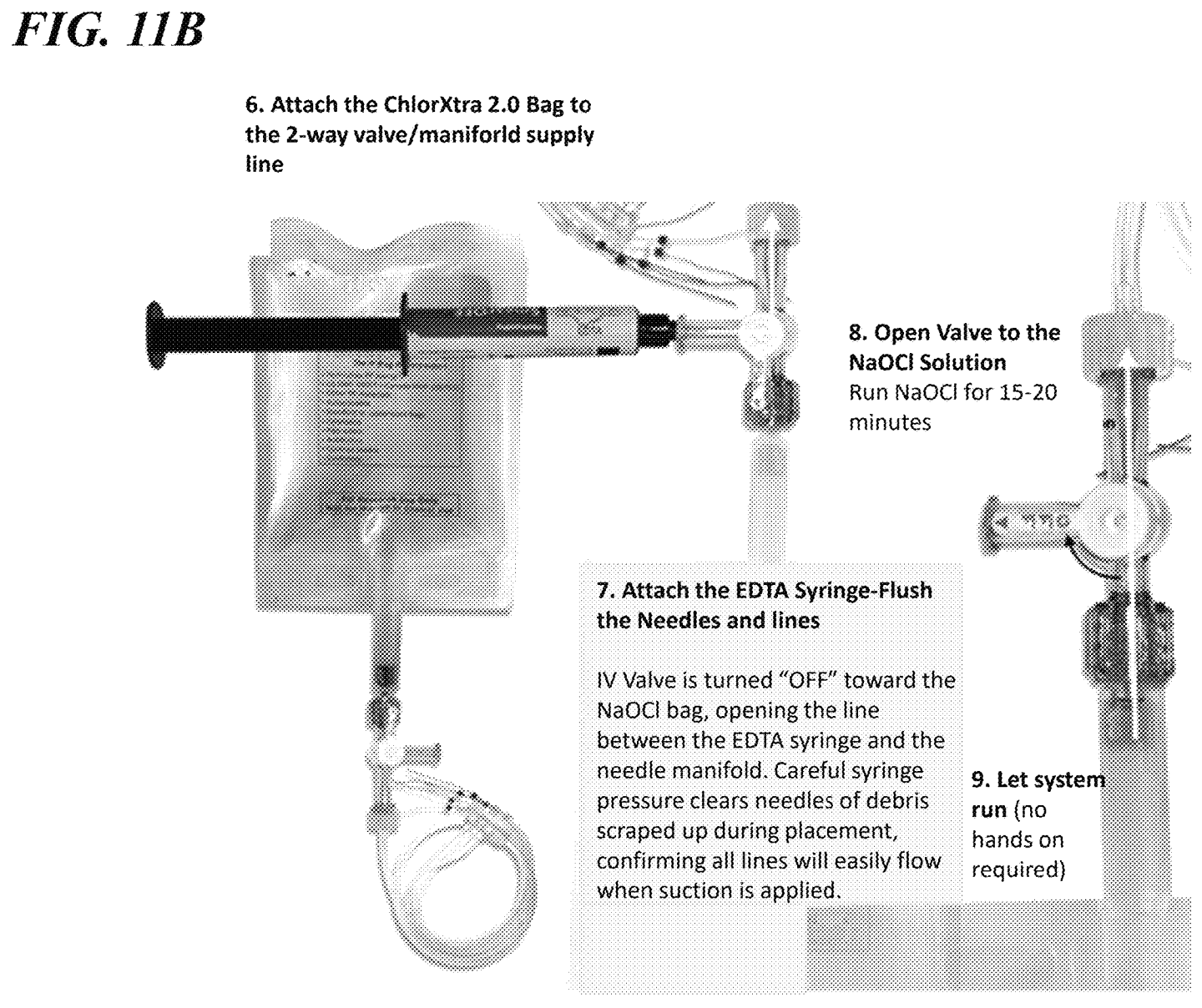

6. Attach the ChlorXtra 2.0 Bag to the 2-way valve/maniforld supply line

8. Open Valve to the NaOCl Solution
Run NaOCl for 15-20 minutes

9. Let system run (no hands on required)

7. Attach the EDTA Syringe-Flush the Needles and lines

IV Valve is turned "OFF" toward the NaOCl bag, opening the line between the EDTA syringe and the needle manifold. Careful syringe pressure clears needles of debris scraped up during placement, confirming all lines will easily flow when suction is applied.

*FIG. 12*

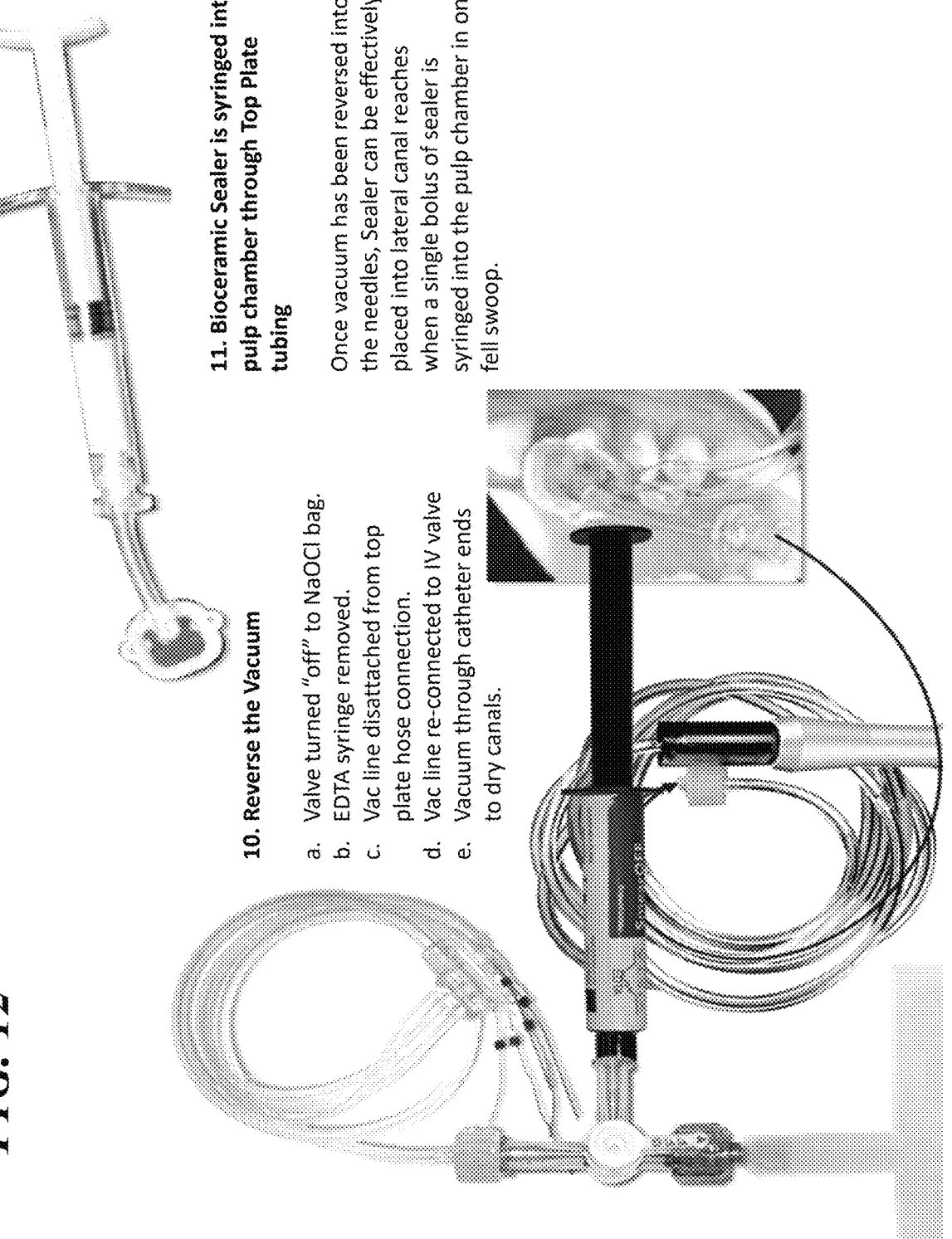

11. Bioceramic Sealer is syringed into pulp chamber through Top Plate tubing

Once vacuum has been reversed into the needles, Sealer can be effectively placed into lateral canal reaches when a single bolus of sealer is syringed into the pulp chamber in one fell swoop.

10. Reverse the Vacuum a.  Valve turned "off" to NaOCl bag.
b.  EDTA syringe removed.
c.  Vac line disattached from top plate hose connection.
d.  Vac line re-connected to IV valve
e.  Vacuum through catheter ends to dry canals.

VACUUM DRAWN IRRIGATION FOLLOWED BY INSTANT OBTURATION OF A ROOT CANAL SYSTEM USING A SINGLE STAGING ASSEMBLY

CROSS-REFERENCE TO CO-PENDING APPLICATIONS

This application is the United States National Phase of PCT Patent Application No. PCT/US2021/021798 filed 10 Mar. 2021, which claims priority to U.S. 62/987,463 filed Mar. 10, 2020, and U.S. 63/091,872 filed Oct. 14, 2020. The content of each is incorporated by reference herein.

BACKGROUND

This disclosure is in the field of dentistry and, more specifically, apparatuses, systems, and methods designed to deliver a liquid to irrigate, flush, disinfect, or debride a root canal system after the canal system has been shaped by a rotary mechanical instrument such as a reamer or file, and to seal the root canal system.

Dentin tooth structure is formed from its periphery inward by the dental pulp. When tooth development is complete, a space remains inside its crown and root structure, containing this formative organ. This space includes a pulp chamber inside the crown of the tooth, and one or more primary canals extending from the pulp chamber floor into and through the relative center of its roots to their apices. Often there are lateral root canal spaces projecting off of those primary canals, such as lateral canals, fins, and loops as well as isthmus spaces when two primary canals exist in a given root.

When dental pulps are injured by physical trauma to the tooth or are infected by bacteria entering these spaces through tooth decay, they often degenerate and necrose because their blood supply has few portals of entry from the well-perfused periradicular tissues. During this degenerative process, very intense pain is often experienced by patients because the inflammatory swelling associated with pulp disease is contained inside the hard tissue encasement of the dentin root structure. After this degenerative process progresses to pulp necrosis, bacteria—safe from immune cells and antibiotics because of the disrupted blood supply— invade the root canal spaces, replicate, and extend from inside to outside the root through the canalar portals of exit, causing infections in the surrounding alveolar bone and severe pain when these infections become acute.

Root canal treatment is performed in the short term to alleviate the pressure-induced pulpal or periradicular pain. In the longer term, the objective of root canal treatment is to return the patient's tooth to a functional, disease-free state. Both of these necessary outcomes are accomplished by entering the root canal system with mechanical instruments such as hand and motor-driven endodontic files and reamers, digesting dying pulp remnants and disinfecting the canal spaces with irrigating solutions, and then hermetically sealing these spaces with filling material to prevent its reinfection.

Root canal systems have complex geometries that prohibit complete preparation solely by mechanical means such as reamers and files. By way of illustration, reamers and files cannot remove pulp tissue out of long (3 mm) and narrow (0.1 mm) canals like isthmus canals. Therefore, the most challenging aspect of root canal treatment is cleaning root canal systems to their full apical and lateral extents, yet the success rates of root canal treatment are directly related to the thoroughness of this procedure.

Cleaning root canal systems is difficult because reamers and files cannot remove pulp tissue and infection out of canal regions that are lateral to the primary canals, nor can they disinfect any part of these spaces. Clinicians must use caustic sodium hypochlorite ("NaOCl") solutions to achieve those critical objectives. While there are iatrogenic outcomes from misuse of NaOCl irrigating solution during root canal treatment reported in the endodontic literature, it is the only known cleaning agent capable of killing all bacteria in the mucinous biofilms that establish residence in RC systems. See e.g. Costerton et al. *How bacteria stick, Sci Am* 1978; Bacterial biofilms: A cause of persistent infections. Science 1999.

Additionally, not only are reamers and files incapable of disinfecting root canal systems, whenever used to prepare canals, they actually make the canal dirtier because they leave a smear layer of cut organic and inorganic debris on the dentin walls that can only be removed with a weak acid irrigant such as ethylene diamine tetra-acetic acid ("EDTA") or citric acid. See e.g. J.50. Baumgartner & 50.L. Mader, *A scanning electron microscopic evaluation of four different root canal irrigation regimens*, J. Endo, 13:4, 1987. The prior art therefore makes use of liquids to irrigate, flush, disinfect, or debride the root canal system.

Irrigants and disinfectants known in the field such as NaOCl, hydrogen peroxide, and EDTA can reach areas of the canal system that cannot be reached by reamers and files and can dissolve and disinfect organic debris as well as clear the canal walls of calcific debris created by the reamers and files. However, for the irrigant to be effective, the needle providing the fluid must be placed near the apex of the canal which, under positive pressure, increases the risk of inadvertent injection of the irrigant or disinfectant beyond the apex and into periapical tissues, causing extreme swelling and pain to the patient. These and other types of complications are reviewed in M. Hulsmann & W. Hahn, *Complications during root canal irrigation—literature review and case reports,* 33 Intl. Endo. J. 186 (2000), the content of which is incorporated by reference herein.

The chemical dynamics that limit the ability to digest pulp in the lateral recesses of root canal systems is simply this: as soon as NaOCl hydrolyzes a bit of connective tissue-losing an oxygen ion in the process-it becomes inactive. While a pool of NaOCl can continually bring fresh, active chemistry to bear, the volume of solution available in canals at the dissolution front is severely limited. Irrigation efficacy in root canal system spaces is further limited by the accumulation of gasses liberated by this process.

One of the most critical things to understand about NaOCl is that although it can kill any pathogen on a counter top or dissolve an entire broached pulp in a dappan dish in just 10 minutes, it requires much longer to achieve the same effect in a root canal. Research and clinical experience have shown that when using conventional passive irrigation methods to apply NaOCl to canal forms, approximately 40 minutes of passive NaOCl irrigation is needed to achieve a 100% kill (or near 100% kill) of resident bacteria and adequate removal of pulp remnants. See e.g. H. K. Haapasalo et al., *Inactivation of local root canal medicaments by dentine: an in vitro study*, Int Endo J 2000; 33:126-31; B. Retamozo et al., *Minimum contact time and concentration of sodium hypochlorite required to eliminate Enterococcus faecalis*, J Endo. 2010; 36(3):520-523.

In general, irrigation efficacy has suffered in proportion to the time saved by rotary instrumentation. When it took 10-20 minutes to shape canals with hand files—flushing with NaOCl between instruments—irrigants were in molar root canal systems a total of 30-80 minutes and the canal systems were remarkably clean by the time conefit and filling was initiated. However, the procedural time savings that came with the advent of motor-driven root canal preparation in the late 1990s indirectly increased root canal therapy failure rates. When shaping times dropped to 1-2 minutes with rotary files, endodontists began seeing an increase in short-term failures. Many endodontists reverted to multi-visit root canal treatment, where the unrecognized irrigation inadequacy was solved with the application of calcium hydroxide paste (a caustic analog to NaOCl) into root canal systems between appointments. See M. Manfredi et al., *Single versus multiple visits for endodontic treatment of permanent teeth*, Cochrane Database Syst Rev., Dec. 1; 12, 2016.

Irrigation failures are obscure and difficult to diagnose. Typically, the patient returns to the endodontist after completion of root canal treatment completion complaining of the same pain they had before treatment. Eleven percent of endodontist's cases reported in the National Dental Network were not pain-free within six months after completion of treatment. See D. R. Nixdorf et al., *Differential diagnosis for persistent pain after root canal treatment: A study in the National Dental Practice-based Research Network*, JOE, 41:4, 2015. Half of those cases attributed to misdiagnosing myofascial pain syndrome for irreversible pulpitis, leading to a needless root canal treatment without addressing the original etiology. See id. In the experience of one of the co-inventors (Buchanan), the other half were due to incomplete removal of inflamed pulp remnants.

Persistent post-root canal treatment pain due to pulp remnants is typified by pain referral within the endodontic zone (between the malar eminence and the lower border of the mandible), no relief despite administration of antibiotics, no periradicular lucencies seen in cone beam computed topography ("CBCT") imaging, and, at most, slight to moderate percussion or biting sensitivity or both. Worse still are patients who present a history of moderate to severe pulpitis. The inflamed pulp remnants can be too injured to recover, yet persist in vitality when located close to the rich periradicular blood supply.

Virtually all attempts to improve endodontic cleaning capabilities have revolved around more effectively applying and activating solutions of NaOCl and EDTA. See e.g. H. K. Haapasalo H K et al., *Inactivation of local root canal medicaments by dentine: an in vitro study*, Int Endod J 2000; 33:126-31; B. Retamozo et al., *Minimum contact time and concentration of sodium hypochlorite required to eliminate Enterococcus faecalis*, J Endo. 2010; 36(3):520-523.

The length of time needed for NaOCl to be effective within a root canal is a matter of canal geometry and fluid dynamics, coupled with the chemical dynamics of connective tissue hydrolyzation. Root canal systems harbor pulp tissue in longitudinal spaces that can only be rinsed from coronal directions, so the pulp interface available for digestion by NaOCl may have a circumference of about 0.1 or 0.2 mm. Compare this relatively small irrigation front to a broached pulp dropped in a pool of bleach. The pulp, shelled from its root covering, is actively dissolved on every lateral surface and is gone in 5-10 minutes.

The chemical dynamics that limit NaOCl's ability to digest pulp in the lateral recesses of root canal systems is simply this: as soon as NaOCl hydrolyzes a bit of connective tissue it loses an oxygen ion in the process and becomes inactive. See 50. Estrella et al., *Mechanism of Action of*

*Sodium Hypochlorite*, Braz Dent J, 13(2):113-117, 2002. While a pool of NaOCl can continually bring fresh, active chemistry to bear, the volume of solution available in canals at the dissolution front is severely limited. As mentioned, irrigation efficacy in root canal system spaces is further limited by the accumulation of gasses liberated by this process.

The accumulation of gas liberated by this chemical process, leading to vapor lock, has led some endodontists to adopt negative pressure irrigation ("NPI"). Negative pressure irrigation systems—like those disclosed in U.S. Pat. No. 4,276,880 to Malmin et al., U.S. 2005/0287498 to Schoeffel et al., U.S. 2018/0153644 to Bosisio et al., U.S. 2005/0170312 to Pond et al., and U.S. Pat. No. 6,971,878 to Pond—are intended to reduce or eliminate potential complications like vapor lock during irrigation. Multi-canalar systems like those disclosed by Pond present difficulties for a clinician. For example, in his preferred embodiment have fixed working lengths that cannot be adjusted (cutting the needle can close the end), and in some embodiments a screen designed to register and hold the needles obscures visibility, making it difficult to place the needles in each canal and to appropriate depth. Additionally, Pond requires the clinician place a layer of adhesive Additionally, Pond requires the clinician to place a layer of adhesive (light curable or other) over a screen type material without occluding needles or causing a fluid leak, which makes establishing a negative pressure system practically unfeasible.

Scientific research and clinical experience shows NPI to be (1) one of the most effective methods of cleaning or debriding root canals, (2) very inexpensive as it uses NaOCl, the most inexpensive and most universally accepted endodontic irrigating solution and the suction system found in every dental office, and (3) the safest method of applying the NaOCl into root canals. Despite the exceptional efficacy shown by research and clinical experience, prior art NPI systems such the Kerr Endodontics ENDOVAC™ system (the "Kerr system") include several design features that have severely limited their use in clinical practice.

The first limiting feature is the needle, which includes 12 micro-ports within the first 1 mm near the distal end (see e.g. FIG. 1). The ports frequently clog as dental pulp fragments and cut dentin debris is sucked into the ports during use. The Kerr system needle, for example, has a size 0.32 mm external diameter, is a non-tapered needle with four sets of three laser-cut, laterally positioned offset holes that are immediately proximal to its closed distal end (about the first 0.70 mm). Each hole of the set is 100µ in diameter (0.1 mm, smaller than the internal diameter of the needle) and spaced 100µ apart. To reduce the potential for clogging, the systems require two-stages: a gross evacuation stage in the coronal area of the canal and then, using the smaller, micro-ported needle, evacuation at the apical area of the canal.

The second limiting feature is the time required by the clinician when using the system in multi-canaled teeth because the clinician must actively hold the NPI needle at the end of in a given canal as the solution is evacuated down the root canals and out into the suction system attached to the NPI needle.

Current NPI systems are limited to a uni-canalar effect, meaning that only a single canal at a time can be actively cleaned with NPI. Because of this, prior art NPI systems actually increase the dentist's workload in multi-canalar teeth. Currently, using NPI instead of PPI can reduce the time needed to complete cleaning of a root canal with NaOCl from 40 minutes (PPI) to 5 minutes (NPI), however if NPI requires five minutes of constant NPI irrigation per canal, that necessity times four equals twenty continuous minutes of attention required by the dentist rather than only ten minutes of the dentist's time spent actively irrigating with PPI.

The third limiting feature is that NPI currently requires constant attention by the clinician to repeatedly add NaOCl to the access cavity as the solution is drawn to the end of the canal and is evacuated through the NPI needles. Whether the tooth being treated needs five minutes or 20 minutes of constant attention during NPI irrigation, it is much effort expended for a very simple need, replenishment of solution. Therefore, suctioning NaOCl solution with an irrigating needle is safe but not necessarily effective.

One reason why research on the Kerr system has showed such excellent results is that unlike most clinicians irrigating for seconds at a time, users of the Kerr system tend to irrigate continuously. Constant flow irrigation is critical to soft tissue degradation because as soon as sodium hypochlorite contacts soft tissue, tissue hydrolysis stops.

Almost all prior art irrigation systems work in a single canal at a time; that is, they are uni-canalar in function. When used in multi-canalar teeth, clinicians must hang on to the activation instrument for 20-40 minutes in a four-canal molar instead of letting a longer passive soak time (e.g. 40 minutes) do the job without much hands-on time required.

To improve the efficiency and effectiveness of NPI systems, U.S. Pat. No. 10,779,920 B2 to Buchanan discloses a multi-canalar NPI system, the contents of which are incorporated by reference herein.

A multi-sonic endodontic cleaning device, Sonendo, Inc.'s GENTLEWAVE® system (the "Sonendo system") includes a multi-canalar approach. See also G. Olivi & E. DiVito, *Photoacoustic Endodontics using PIPS: Experimental background and clinical protocol*, J Laser Health Acad, 1, 2012 (discussing a multi-canalar approach using photo-activated photo-acoustic streaming). The procedure for its use requires creating, with light-cure polymer, a custom gasket (platform) on the tooth being treated, so that the procedure instrument can be placed on it and operate in the root canal system as a closed system. The procedure instrument creates a negative-pressure environment inside the root canal system, allowing the instrument to spray NaOCl at a very high backward pressure without risking a hypochlorite accident from solutions passing through the ends of canals and into periradicular tissues. At the end of the molar procedure instrument, a titanium tube projects into the pulp chamber, just short of the pulp chamber floor, and this propagates multi-sonic energy that reverberates down canal spaces along the hard tissue dentin surfaces, very effectively breaking intracanal debris loose. See M. Khakpour et al., *Tissue dissolution by a Novel Multisonic Ultracleaning System and Sodium Hypochlorite*, JOE, 40(8), 2014; see also U.S. Pat. No. 8,753,121 to Gharib et al.

The Sonendo system makes use of degassed (or substantially degassed) liquid for the following reasons:

a. inhibit, reduce, or prevent bubbles from coming out of solution during treatments to reduce vapor lock b. acoustic waves generated by the pressure wave generator can propagate through the degassed liquid to reach and clean the surfaces, cracks, and tooth spaces and cavities better; and 50. degassed liquid can be able to penetrate spaces as small as about 500 microns, 200 microns, 100 microns, 10 microns, 5 microns, 1 micron, or smaller, because bubbles are inhibited from coming out of solution and blocking these spaces.

See Id.

This cleaning efficacy of the Sonendo system is on a level not seen before with rotary mechanical instruments, allowing canals with little or no instrumentation to be cleaned during an 8-minute procedure time consisting of a 1.5-minute cycle of distilled water cleaning, followed by a 5-minute cycle of 3.5% NaOCl cleaning, then finished with a 2-minute cycle of 8% EDTA cleaning. While the Sonendo system is more effective than other prior art methods, it requires significant capital investment by a practitioner in addition to ongoing per procedure fees. And there is a three to five minutes of hands-on time required to build and trim a platform in advance of the 8-minute hands-on Sonendo procedure time.

The method of action is driven by irrigating solutions that have been processed in the console, and pumped to 9,000 psi, shot or injected through the procedure instrument tubing and the procedure instrument itself until it hits what is called an impingement plate whereupon its curved inner surface reflects that intense fluid stream 180 degrees backwards to be sucked up the circular waste gate around the circumference of the procedure instrument head. This is clever for several reasons. First, a negative pressure is created inside the root canal system due to the Bernoulli Effect, effecting the safety net to keep the NaOCl contained within the root canals and not pass through the ends of canals. Second, and simultaneously, the impingement plate is vibrated by the fluid jet hitting it, and since water is not compressible, this sonic energy is transmitted very effectively to the ends of canals.

By way of experiment, and because one of the co-inventors of the present application (Buchanan) was having trouble finding an MB2 canal orifice, the inventor deployed a Sonendo platform and used the 90 second distilled water cycle at the beginning of the Sonendo procedure to pound the pulp chamber. The Sonendo system sonics opened up the MB2 that was hiding under some dense calcific material. The sonic energy reaches to the very ends of each canal opening. Dentin is a hard tissue and as such, it is an excellent reflectant for sound energy and because most root canals are tapered in shape, this sound energy tends to be amplified as it travels into smaller canal diameters, and this moves hypochlorite in a very effective manner.

For example, in other tests conducted by Buchanan, an MB2 canal that was never instrumented was cleaned by the Sonendo system. Post-op radiographs showed effective cleaning and fill. In another test of the Sonendo system conducted by Buchanan, the tooth involved extensive cervical internal resorption that had reached the outside surface in a couple of areas. Buchanan used a molar procedural instrument for this by building a chamber above the cavo surface of the access cavity that was large enough to fit the sonic extension inside it. Treated in a single visit, the bio-ceramic sealer coursed through a multiplicity of resorption lacunae.

Because of the efficacy of the Sonendo system's sound energy, root canal shaping requirements are changed in some very fundamental ways, mostly to minimally invasive endodontics 0.03 and 0.04 taper canal shapes, with the shaping objective transformed to "just enough shape" to allow irrigation and the fill, abandoning the concept that shaping root canals cleans them.

Yet, with every new technology, there are inherent limitations. For example, a C-shaped molar, treated by Buchanan using the Sonendo system, continued to refer pain after treatment and responding painfully.

With the anatomy of C-shaped molars in mind, Buchanan's best theory about the etiology for the continuing pain after treatment revolved around inflamed pulp remnants left in the enormously wide swath of isthmus space between the ML and Distal canals. To test this theory, Buchanan assembled an isthmus research block with prosciutto ham in the isthmus space, set it up in a vice, built a Sonendo platform, and watched Sonendo system at work. The Sonendo system begins with a 90-second distilled water cycle that performs a leakage check. The sonic energy delivered in the presence of distilled water is very capable in shaking things up, however, nothing is happening to the pulp analog.

Buchanan then filmed the effect of this sonic energy in the presence of sodium hypochlorite. This footage when shown with time lapse makes it very apparent that the pulp analog is literally melting away, becoming smaller, and just before all of the pulp analog is digested, the five-minute Sonendo system NaOCl cycle ends. However, unexpectedly and surprisingly, nothing happens to the pulp remnants during the distilled water and EDTA cycles that follow. So, it is actually the sodium hypochlorite that is doing the job of digesting pulp tissue in lateral spaces. Granted, Sonendo's multi-sonic energy significantly accelerates the saponification of soft tissue in root canals. Regardless, once again, sodium hypochlorite is the main event in root canal treatment success.

To further test this theory, Buchanan connected another Sonendo procedure instrument and when the NaOCl cycle came on, the pulp analog remnant was totally eliminated with 2.5 minutes of extra time. This led Buchanan to conclude the most sophisticated agitation in the world will not digest pulp tissue in lateral spaces without NaOCl.

Multi-sonic energy without NaOCl does not break up and remove pulp tissue because this soft tissue actually absorbs and dissipates the sound energy. The tests show that none of the pulp analog in an isthmus block was affected in the least during the Sonendo procedure with $H_2O$ or EDTA. Only during the NaOCl cleaning cycle was pulp tissue digested. This suggests the pulp tissue is dissolved by NaOCl, not by agitation.

In summary, the Sonendo system is very effective but has limited minimally evasive endodontic access sizes, and is expensive (e.g. $80,000/console, $5,000/yr. maintenance after the first year, and $100 for each procedure instrument. In other tests conducted by the inventor of the system disclosed in US 2018/0338821 to Buchanan, ENDOVAC™ micro-cannulae placed near the ends of each canal, sealed at the cavo surface of the tooth and applied suction, could draw NaOCl irrigating solutions ported into the pulp chamber continuously down the canals to be evacuated out of the tooth through the cannulas into the vacuum system. The advantages of this approach were that it would be multi-canalar, require little hands-on time for clinicians, and that it would be absolutely safe. In tests of the closed irrigation system a cuspid was cut to a 30-.4 shape and the system ran for 30 minutes of constant negative pressure NaOCl irrigant flow with a 15 second rinse with EDTA before splitting the tooth. Scanning electron microscope photos confirm that there were no signs of debris in coronal, mid-root, or apical regions. Contrary to some researchers' findings, Buchanan did not see any "over-etching" of dentin from the half hour of irrigating time with NaOCl. The only problem was that the needle had to be flushed with EDTA every five minutes or the solutions slowed as debris collected around the micro-ports. That was very time and attention consuming when the objective was to have it run without the endodontist or assistant in the operatory. It took 40 minutes to match the isthmus cleaning result seen with the Sonendo system, due to the negative pressure needle openings plugging up with analog pulp debris, severely limiting the flow of the irrigating solution.

Therefore, what is needed is an endodontic irrigation and filing system and method that avoids the complications and costs associated with the prior art systems and methods and yet provides gross evacuation and cleaning in less time than those prior art systems and methods.

SUMMARY

Embodiments of this disclosure provide a staging assembly for negative pressure, multi-canal irrigation of a root canal system followed by obturation. The staging assembly may be sized for an anterior, a premolar, or a molar tooth (and their respective root canal systems) and is sealed to the tooth. The staging assembly is luted to the lingual surface of anterior teeth or the occlusal surface of posterior teeth, over and around the access cavity of the tooth (that has been previously cut as part of the overall root canal procedure).

The staging assembly may be part of a kit that includes a plurality of catheters sized for insertion into the root canal system. Embodiments passively draw the irrigating solutions out the ends of the catheters in a completely safe manner. Then, after the root canals have been cleaned, by switching and applying the vacuum pressure to the needles, sealer can be drawn into the pulp chamber, to the ends of the root canals, thus performing obturation of complex root canal systems within one to two seconds.

To hold the catheter in its proper position in the canal, the catheter may include a stop and the staging assembly may include a corresponding stop hold. The distal end of the catheter can be positioned 2 mm to 4 mm from the terminus end of the root canal. The catheters may be thin-walled catheters in a range of 29 gauge to 31 gauge for appropriate flow rate and clearance. The staging assembly is then sealed, creating a closed system.

Irrigating solution is vacuum-drawn out the ends of the catheters and debris is evacuated through a vacuum port of the staging assembly. (Because of the negative pressure draw, should the distal end of the catheter somehow lock into a canal wall or extend into or past the root terminus, flow automatically stops.) During irrigation, no hand-on time is required by the clinician.

Prior to use, the irrigating solution may be injected with air and then physically shaken by the clinician, the surfactant in the NaOCl foams the solution until the air foams into solution. Buchanan's research revealed that running foamed irrigant through the catheters decreases the time for dissolution of pulp tissue remnants by half due to the shear effect of the air bubbles expanding outside the catheter ends. The irrigating solution may also be heated. In embodiments, no ultrasonic energy or multi-sonic acoustic wave needs to be applied to the irrigating solution for the system and method to be effective in removing debris from the canals, including lateral regions of the canals. In some embodiments, aeration as described above is applied, or heating the solution, or heating and aeration may be applied to speed cleaning.

After irrigation, vacuum is reversed to dry the canal. Obturation occurs through the vacuum port. A bio-ceramic (pre-mixed) filling material may be used for obturation. The bio-ceramic material can further be optimized for vacuum delivery by modifying its flowability as proven by increasing the carrier concentration in benchtop experiments.

Embodiments of the staging assembly may include a stage which has a flexible staging skirt attached to a hard plastic staging ring. The flexible staging skirt adapts to the specific tooth being treated, sealed onto the tooth with a viscous light-cured (or chemically-cured) polymer or sealant. The staging ring includes a catheter fence that secures the catheters and rubber catheter stops (to control each of the catheter's positions in each of the root canals) into what are called "stop hold" openings into which the stops are placed. The hard plastic staging ring may also include alignment sockets for a top plate with a vacuum port. The top plate fits onto the hard plastic staging ring and is sealed in place with the light cure polymer, completing the closed system vacuum seal In embodiments of a method of this disclosure, the staging assembly is luted to the tooth, the catheters are positioned in the canals, and the top plate is inserted into the staging ring and sealed, thus creating a closed system inside the tooth. The barbed port exiting the top plate has a short plastic tube luted to it with a luer connector at its other end. One end of the vacuum line is inserted into a chairside dental suction source and the other end is connected to this luer connector coming from the top plate vacuum port. The catheter manifold line is hooked up to the mini-IV Bag of NaOCl. Vacuum pressure is then applied to the root canal system through the top plate vacuum port, drawing irrigating solution out of the ends of the catheters in a constant flow without risk of inadvertent injection of the irrigating solution beyond the apex and into periapical tissues. This unique delivery of irrigating solution (1) prevents any clogging of the catheters by debris evacuated from the canals and (2) creates a flow that moves ahead of the catheters, thereby cleaning to the ends of canals without needing the canals to be enlarged enough to allow the catheters to be placed to full length in the canals (as classic negative pressure irrigation procedures require).

The port of the top plate also serves as the filling material injection port after the irrigating procedure has been completed, at which time the suction forces are reversed from the pulp chamber to the catheters, drawing the filling material from the pulp chamber to the ends of the catheters, thereby nearly instantly obturating each of the canals as well as the lateral recesses of the root canal system, providing a complete fill of the root canal space previously occupied by pulpal tissue.

Embodiments of a system for use in irrigation and obturation of a human tooth root canal system include a staging assembly comprising a connected staging skirt and a staging ring; the staging skirt made of a first material and flexible, the staging ring made of a second material and rigid; the staging skirt further including flaps defining a cavity having a predetermined size for connection to a human tooth; the staging ring further comprising a catheter fence including a plurality of spaced-apart catheter openings and catheter stop holds; the catheter fence defining an open, fenced-in area; at least one port in communication with the open, fenced-in area; and a plurality of catheters, each catheter including a catheter stop sized for capture by the catheter stop hold, the stop being moveable along a length of the catheter.

Embodiments of the system may also include a top plate sized for insertion into the open, fenced-in area, the top plate including the at least one port. The top plate may include a pair of outrigger pegs and the staging ring may include a pair of alignment slots such that when top plate is connected to the staging ring, the outrigger pegs reside in the alignment slots. A vacuum line is connected to the at least one port and an IV bag containing an irrigant solution including sodium hypochlorite is connected to the plurality of catheters. Each catheter may be a thin-walled catheter in range of 29 to 31 gauge and having a blunt cut end with radiused edges, which can left cold drawn or heated treated or annealed to modify its rigidity or ductility. Having an annealed catheter does have advantages in endodontics as the catheter has increased flexibility to improve placement to the terminus. However, having a catheter with improved ductility can also increase the likelihood of collapsing or crimping the catheter while placement. This can be solved by having a proximal portion of the thin-walled catheter being housed by a tube having a different gauge and being harder than the thin-walled catheter.

The system may also include at least one syringe containing either a dental sealant including a light cure polymer, a liquid solution containing ethylenediaminetetraacetic acid, or a bio-ceramic. A three-way valve may be located between the syringe, catheters, and IV bag. One end of the three-way valve connectable to a vacuum pump (by way of vacuum lines connected to the port), another end of the three-way valve connectable to the IV bag, and yet another end of the three-way valve connectable to the syringe.

Embodiments of a method of this disclosure for irrigation and obturation of a root canal system of a human tooth using the system of this disclosure include:

luting a staging assembly onto a cavo surface of the human tooth after an access cavity to the root canal system has been prepared;

positioning, through the staging device, at least one catheter into respective canals of the root canal system, the at least one catheter (one or more catheters placed in the coronal access so that irrigant can reach each canal) passing through the staging assembly and into the root canal system, a distal end of the at least one catheter being in a range of 2 to 5 mm from an apical end their respective canals;

sealing the staging device to form a closed system;

connecting, to a three-way valve, the at least one catheter, a supply of irrigant solution containing sodium hypochlorite, and a syringe containing ethylenediaminetetraacetic acid;

attaching a vacuum line to a port of the staging assembly;

flushing the at least one catheter with the ethylenediaminetetraacetic acid;

after the flushing, irrigating the root canal system by providing the irrigating solution through the at least one catheter, the irrigant solution being drawn out the ends of the at least two catheters by a by applying a vacuum to the vacuum line, the irrigating being in a range of 10 minutes to 30 minutes;

during the irrigating, evacuating the irrigant solution delivered by the at least one catheter along with tissue dissolved by the irrigant solution from the root canal system by the applying of the vacuum, the irrigating and the evacuating occurring continuously and simultaneously with one another;

after the irrigating and the evacuating, drying the root canal system by disconnecting the supply of irrigant solution from the three-way valve, removing the syringe containing the ethylenediaminetetraacetic acid from the valve, detaching the vacuum line from the staging device and connecting the vacuum line to the three-way valve; and applying a vacuum to the at least two catheters through the vacuum line; and after the drying, obturating the root canal system through the staging assembly by connecting a syringe containing a bio-ceramic filler to the three-way valve and syringing the bio-ceramic filler into a pulp chamber of the human tooth;

For anterior and premolar teeth, the method may also include, prior to the luting of the staging assembly, positioning the staging assembly onto the human tooth by way of a placement tool, the placement tool including a head shaped complementary to the open, fenced-in area of the staging ring and a tine that passes through the open, fenced-in area.

Embodiments of devices, systems, and methods of this disclosure are novel and inventive in the way the embodiments:

a) safely deliver caustic cleaning and disinfecting solutions into the most apical and lateral regions of root canals through the ends of irrigating catheters, drawn by negative pressures applied to the pulp chambers of root canal systems;

b) rapidly deliver filling materials into the most apical and lateral regions of root canals, drawn by negative pressures inversely applied through the ends of the irrigating catheters as filling materials are let into pulp chambers through the previous vacuum port;

c) create a closed system to achieve the desired effects;

d) aid the placement and length control of the catheters in the primary canals of teeth receiving treatment;

e) prevent clogging of catheters because they only outflow fluids;

f) provide positive outflow that cleans ahead of the catheter, which is important when it comes to minimally invasive endodontics;

g) achieve extensive lateral pulp removal in under 10 minutes for large anteriors or premolars, 15 minutes for lateral recesses between smaller canals; and 20 minutes for molars (which have the widest isthmus spaces) up to 30 minutes;

g) require only two minutes of hands-on time (none of the clinician's time is needed after staging is completed);

h) are multi-canalar;

i) support single-visit root canal treatment, j) require no capital or maintenance costs;

k) are 100% disposable after procedure;

l) require no electrical power besides chairside suction; and m) support minimally invasive endodontics canal shapes.

BRIEF DESCRIPTION OF THE DRAWINGS

FIG. 6A is a front elevation view of an embodiment of an irrigation catheter of this disclosure. By way of a non-limiting example, the catheter may be 40 mm in length, made of 30 gauge, thin-wall, stainless steel tubing, with a 22 gauge stainless steel over-tube to stiffen the proximal 20 mm of the catheter.

FIG. 6B is a detailed view of the catheter of FIG. 3A. The catheter has radiused edges so it glides around canal curves without scraping up dentin debris which could block the catheter. The catheter includes a blunt cut end because a blunt cut appears to work best for the vacuum-drawn irrigating solution to passively flow ahead of the catheter into the terminal third of small canals.

FIG. 7A is an embodiment of a placement tool that can be used for an anterior staging assembly of this disclosure.

FIG. 7B is an enlarged view of the placement tool in its connected state to the anterior staging assembly.

FIG. 7C is another enlarged view of the placement tool in its connected state.

FIG. 7D is yet another enlarged view of the placement tool in its connected state.

FIG. 8A is an embodiment of a placement tool that can be used for a premolar staging assembly of this disclosure.

FIG. 8B is an enlarged view of the placement tool in its connected state to the premolar staging assembly.

FIG. 8C is another enlarged view of the placement tool in its connected state.

FIG. 8D is yet another enlarged view of the placement tool in its connected state.

FIGS. 10A and 10B show various steps in a method of this disclosure for connecting the staging device to a tooth. Each catheter is placed in respective catheter slots of the staging device and the entire staging assembly is sealed to form a closed system.

FIGS. 11A and 11B show various steps in a method of this disclosure for cleaning the root canal system. Irrigating solution s gravity fed to the catheters and suction is applied to the suction tube, drawing the irrigating solution out from the ends of the catheters. Because the gravity-feed cannot overcome the hydrostatic tissue pressure, dangers associated with positive pressure irrigation can be eliminated and the catheter end may be placed at or near the apex of the canal, at a distance of 2 mm to 4 mm from the apex. The system and method provide automated continuous irrigation and alternating pressure device for irrigation and instantaneous obturation (see FIG. 12).

FIG. 12 shows various steps in a method of this disclosure for drying the irrigated canal system and filling it through the staging assembly.

DETAILED DESCRIPTION

Figures 1A, 1B:
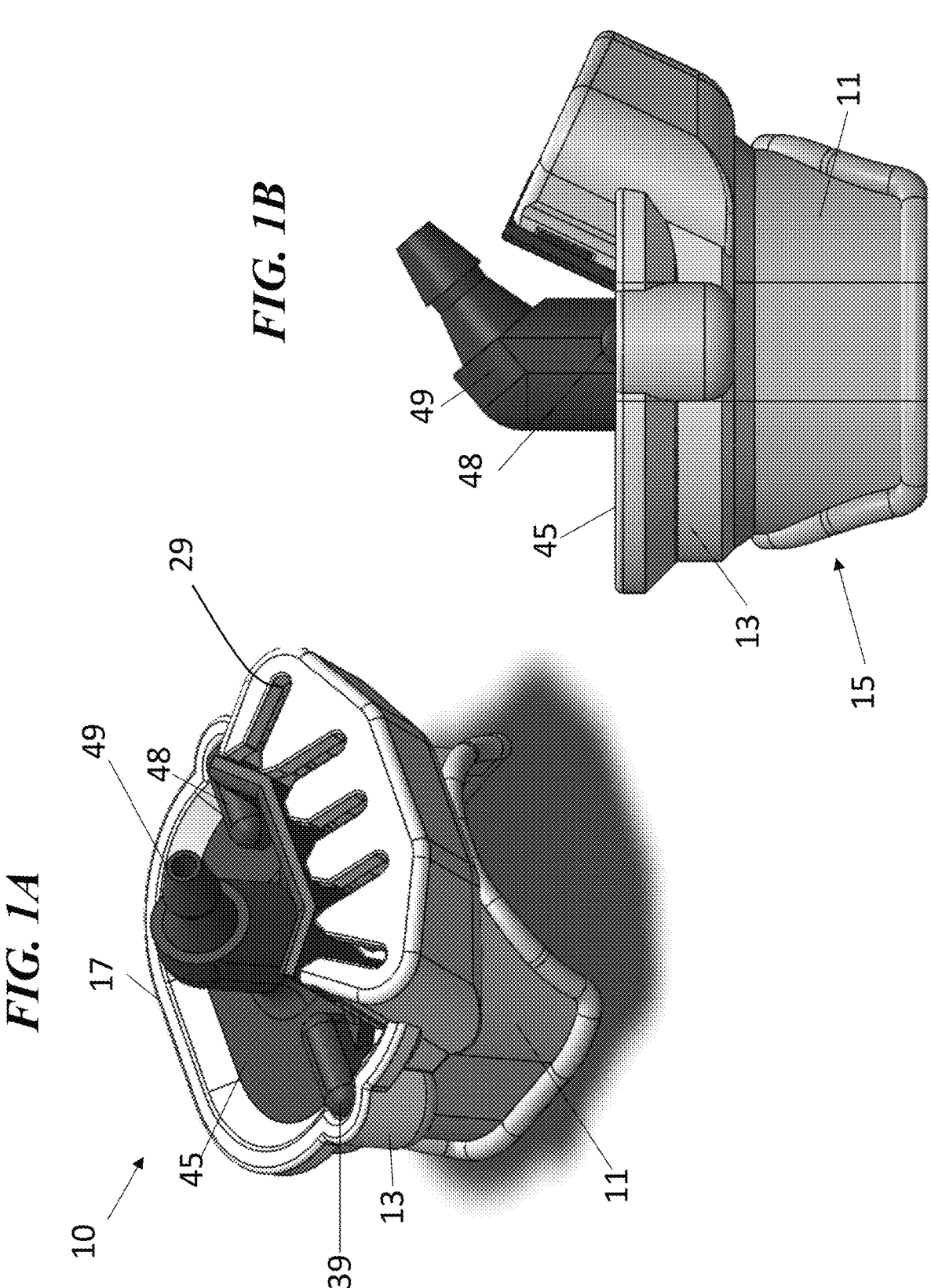
FIG. 1A is an isometric view of embodiment of a staging assembly of this disclosure. The staging assembly includes a staging skirt sized for an anterior, a premolar, or a molar tooth and a complementary staging ring that provides a stabile platform for the irrigation catheters and a suction tube when in use during an endodontic procedure.
FIG. 1B is side elevation view of the staging assembly of FIG. 1A.
Figure 2A:
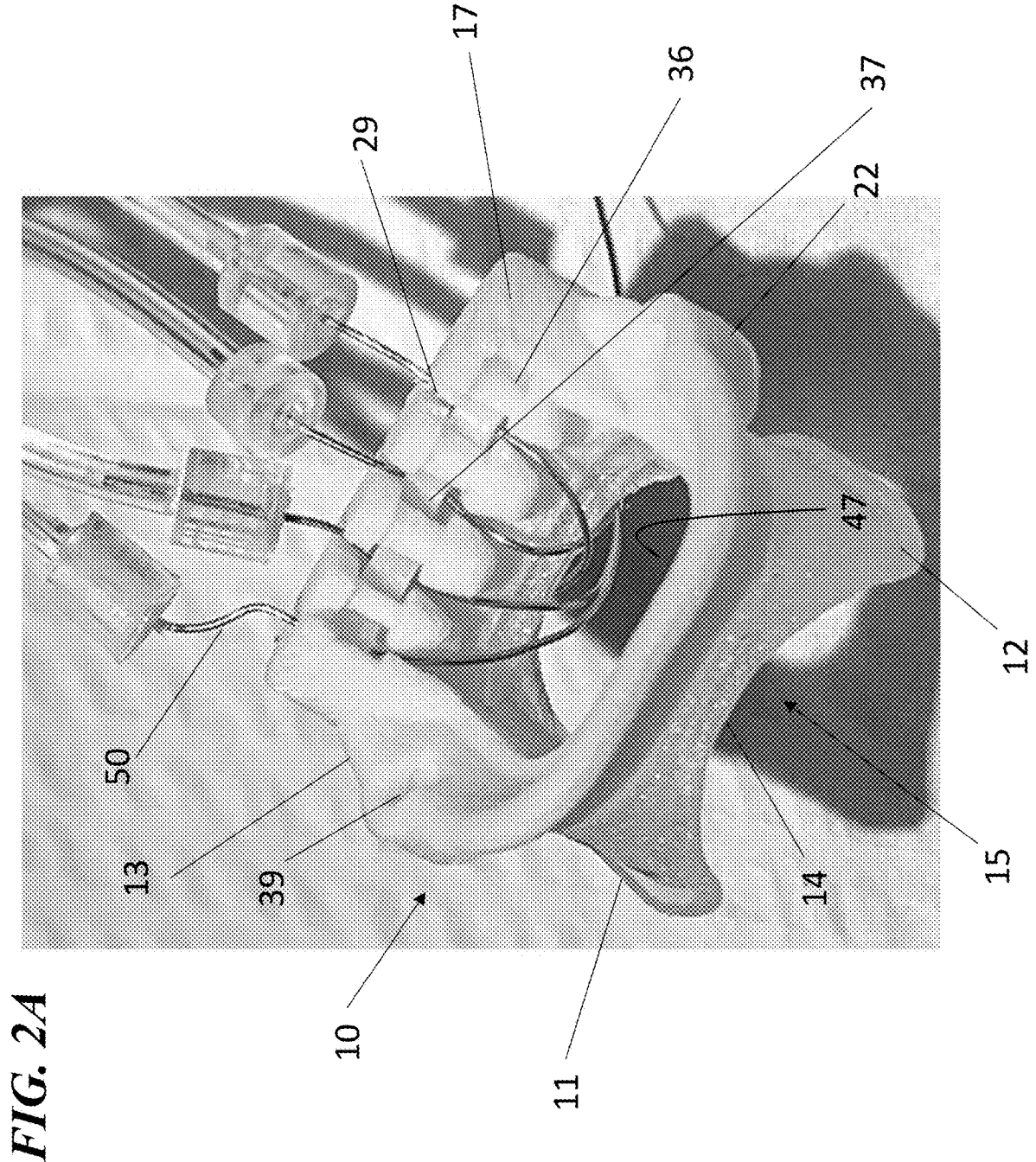
FIG. 2A is an isometric view of another embodiment of a staging assembly of this disclosure. A catheter fence located on the staging ring provides catheter openings and corresponding catheter stop holds.
Figure 2B:
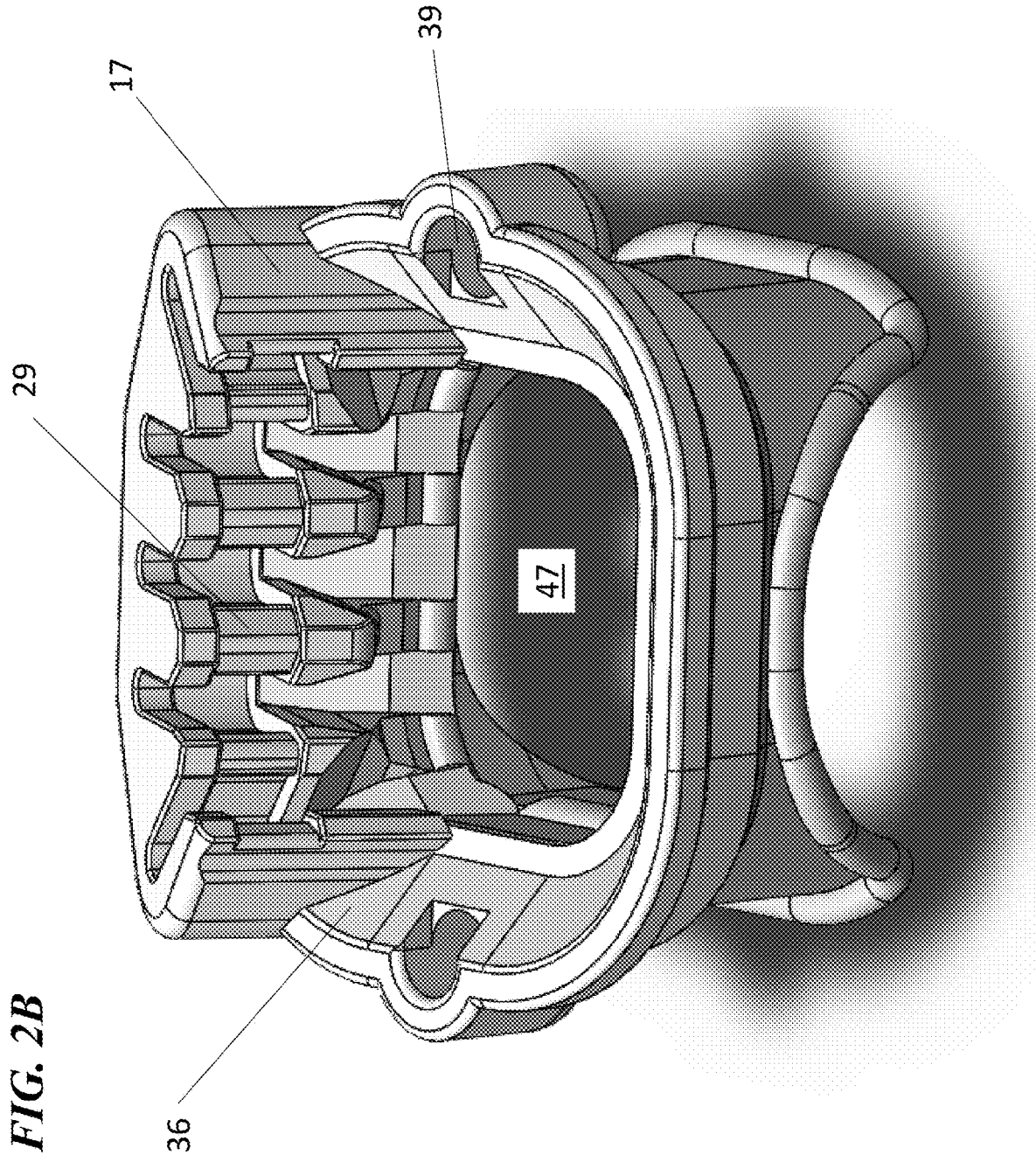
FIG. 2B is another isometric view of the staging assembly of FIG. 2A without the catheters inserted into the catheter fence.
Figures 2C, 2D:
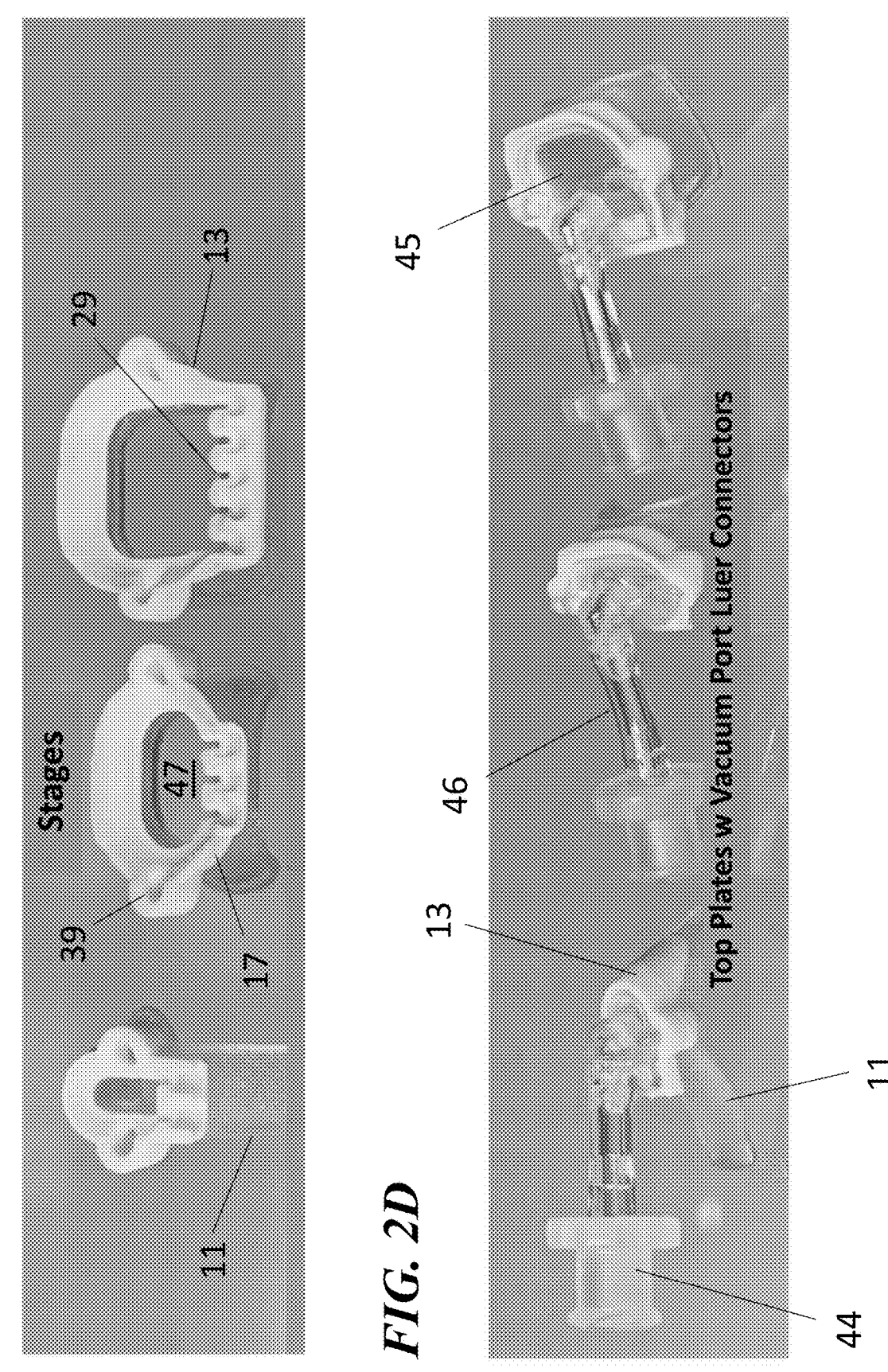
FIG. 2C is an isometric view of a staging assembly of this disclosure—one sized for sized for an anterior tooth, another sized for a premolar, and yet another sized for a molar.
FIG. 2D is an isometric side view of the staging assemblies of FIG. 2C, including the top plate with vacuum port luer connectors.
Figures 3, 4A, 4B:
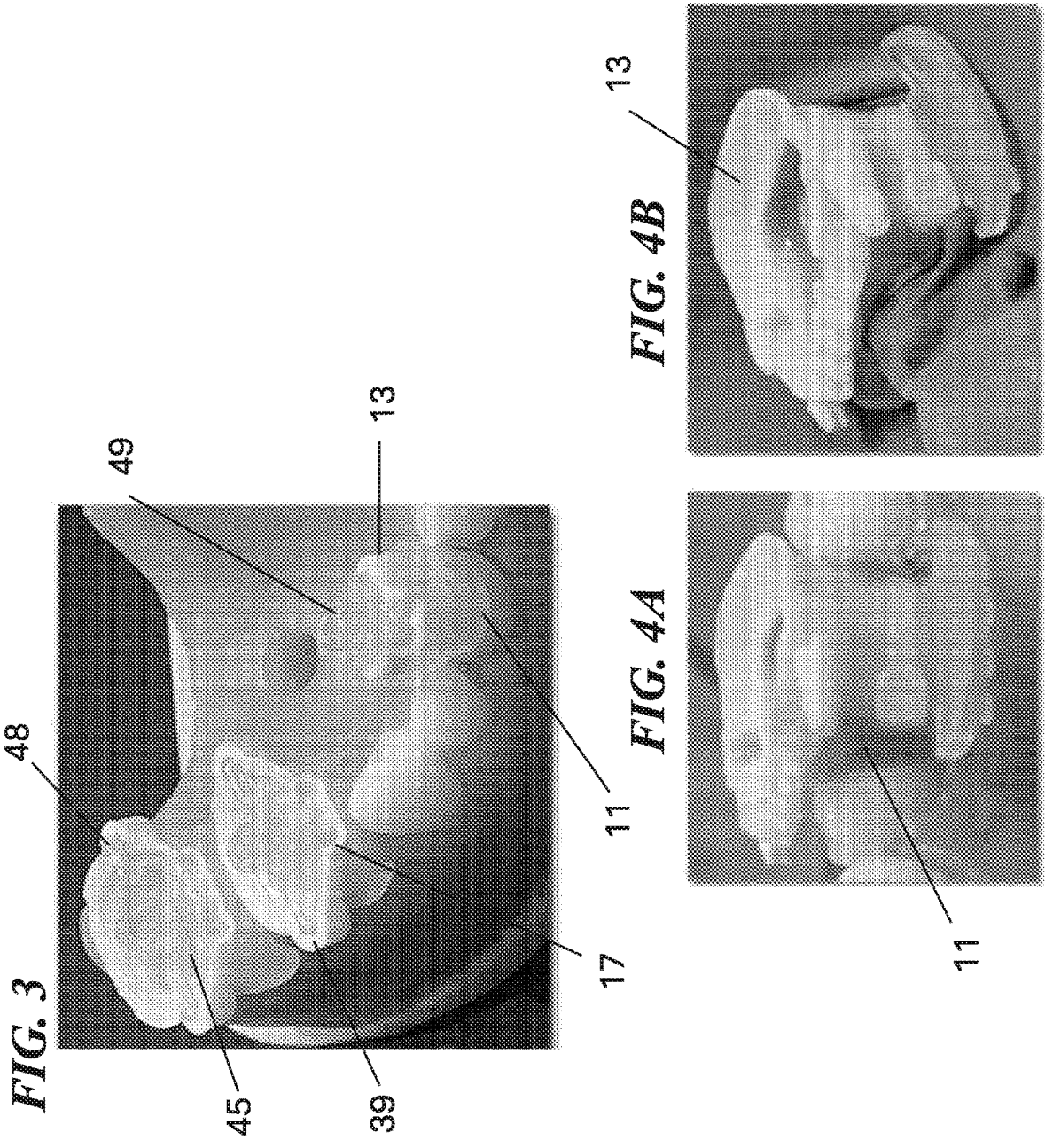
FIG. 3 is an isometric view of a staging assembly of this disclosure—one sized for sized for an anterior tooth, another sized for a premolar, and yet another sized for a molar—when luted to the tooth.
FIG. 4A is a view of an embodiment of the staging assembly secured to a tooth with a subminiature zip tie.
FIG. 4B is a view of the staging assembly of FIG. 5A with a rubber dam in place.
Figures 5A, 5B:
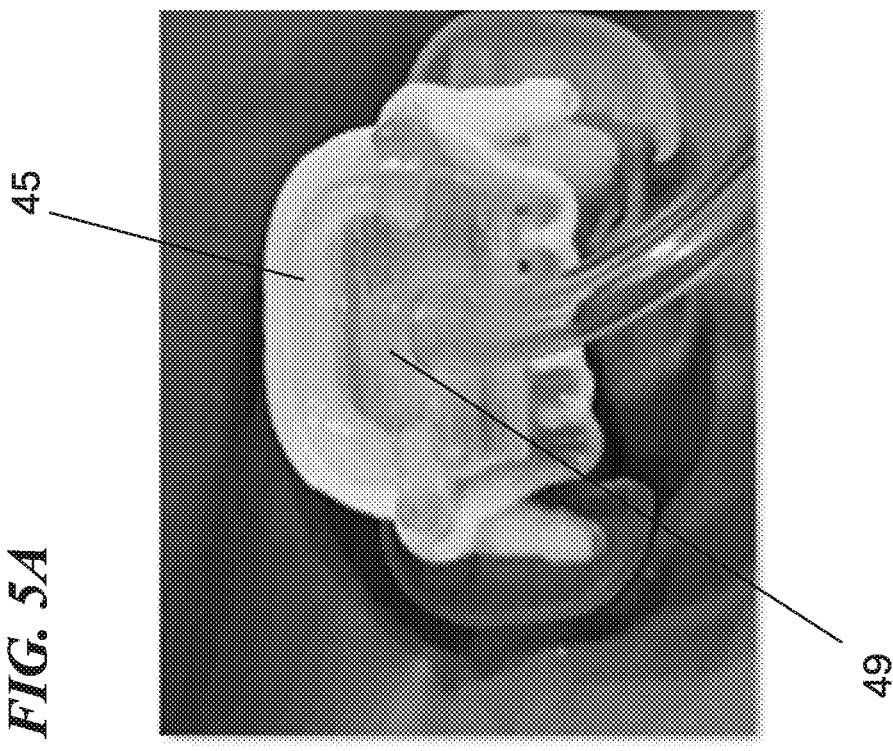
FIG. 5A is an embodiment of the staging device secured to a tooth with a subminiature zip tie and providing suction to the rubber dam and operative fields through a tube connected to a port of a top plate sealed to the staging device.
FIG. 5B is an embodiment of the staging device secured to a tooth with a subminiature zip tie and providing suction to the rubber dam and operative fields through spaghetti tubes. No top plate is used.

Embodiments of this disclosure make use of a staging assembly that is luted to a tooth. Staging is begun after instrumentation and conefit has been completed, by scrubbing the isolated teeth with an alcohol cotton pellet held in a locking plier. Embodiments of this disclosure can clean and fill effectively through super tight openings and can also clean and fill rather extensive isthmus space (e.g. at least 3 mm to 4 mm across) between the MB canals. For teeth that have cervical decay but an intact occlusal surface, this style of minimal invasive endodontic access can leave the tooth just as strong after root canal as it was before. Removing the stage from a patient's tooth is as easy as grasping the buccal and lingual sides of the staging assembly with hemostats, and simply rolling it off sideways.

The staging assembly, which may be 3D printed, provides a stable platform on which to place elongated catheters into the primary canals of the root canal system and a port onto which suction can be connected for negative pressure. The negative pressure draws irrigating solution out of the ends of the catheters as debris is evacuated through the port. A vacuum greater than 7.5 inch of Hg (190.5 mm of Hg) should be used or fluid flow during irrigation can become compromised.

Referring to FIGS. 1A to 5B, embodiments of a staging assembly 10 of this disclosure include a staging skirt 11 made of a first material and a staging ring 13 made of a second material different from the first, the skirt 11 and ring 13 having different flexibilities (rigidities). In embodiments, the staging skirt 11 is flexible and the staging ring 13 is rigid. The staging skirt material may be a rubber material, such as a 3D printed rubber, and the staging ring material may be a plastic material, such as a 3D printed plastic.

The staging assembly 10, and in particular the staging skirt 11, may be attached and sealed to the tooth with a viscous light-cure polymer of a kind known in the art. By way of a non-limiting example, a photopolymerizable hydrophilic sealant can be used. The staging assembly may be a single size to accommodate anterior, premolar, and molar teeth. However, sealing the assembly over a wide range of teeth sizes can prove challenging. Better performance is achieved by making the staging assembly 10 a first size to accommodate anterior teeth, a second size to accommodate premolar teeth, and a third size to accommodate molar teeth. See e.g. FIGS. 2C to 3.

The staging skirt 11 may include flaps 12 defining a cavity 15 and intended to cover the buccal and lingual sides of the tooth and arcuate-shaped sidewalls 14 that accommodate placement relative to the adjacent teeth. For example, the buccal flap 12 of the staging skirt hangs over the incisal edge and is glued to the buccal tooth surface to help stabilize the staging assembly.

The staging ring 13 may include a catheter fence 17 that provides one or more catheter openings 29 and corresponding catheter stop holds 36. In some embodiments, up to five catheter openings 29 are provided, such as can be the case with a molar staging ring 13. An anterior staging ring 13 may have two catheter openings 29 and a premolar staging ring 13 may have three catheter openings 29. Any unused catheter opening 29 can be sealed prior to irrigating the canal.

The catheter fence 17 surrounds a central opening or fenced-in area 47 that provides access to the pulp chamber of the tooth. In some embodiments, the staging ring 13 includes alignment sockets 39 on the buccal and lingual sides 22 of the staging ring 13. A top plate 45 covers the fenced-in area 47.

The top plate 45 include a port 49. The outrigger pegs 48 of the top plate reside within the sockets 39. The port 49 serves as a suction port during irrigation and as a filling port during obturation.

The top plate 45 may be 3D printed and may be made of a third material the same as or different than that of the staging skirt 11 or staging ring 13 and have a flexibility the same as or different than that of the staging skirt 11 or staging ring 13. In embodiments, the top plate 45 is the same material as that of the staging ring 13. The top plate material may be a material selected from the Table 1 below. In some embodiments, the top plate 45 may include an installed vacuum line 46 with a luer connector 44. See e.g. FIG. 2D. The top plate 45 is installed and sealed to the staging ring 13 after the catheters 50 are placed to their appropriate length in the canals and confirmed by radiograph.

TABLE 1

| Staging Assembly Materials, including Top Plate. | | |
|---|---|---|
| Material | 3d Printing Modality SLA | 3d Printing Modality SLS |
| Polyamide (PA) | | DuraForm DuraForm Ex PA2200 PA2201 |
| Polypropylene (PP)-Like | Accura 25 Somos 9120 | PP-Like SLS |
| Acrylonitrile Butadiene Styrene(ABS)-Like | Accura 55 Renshape SL7565 | N/A |
| High(er) Temperature | Accura Bluestone Accura CeraMax Somos Perform Somos Nanotool | DuraForm Glass Filled DuraForm HST 3200 Glass Filled |
| Clear | Accura ClearVue Accura 60 Watershed Renshape SL7565 | N/A |
| Flexible | N/A | DuraForm Flex |

The staging assembly 10 allows the catheters 50 to be placed to any length in the canals and still be secured, unlike prior art systems that require a single, same length of canula as the hub to which the canula are connected must be captured in a suction manifold placed on the tooth. The distal ends 51 of each catheter 50 may be placed within 2 mm to 4 mm of the terminus ends of each canal, with the catheter 50 immobilized by the stop 37 and stop hold 36. In some embodiments the catheter 50 may be placed in a range of 2 to 3 mm, 3 to 4 mm, or 4 to 5 mm from the terminus ends.

Figures 6A, 6B:
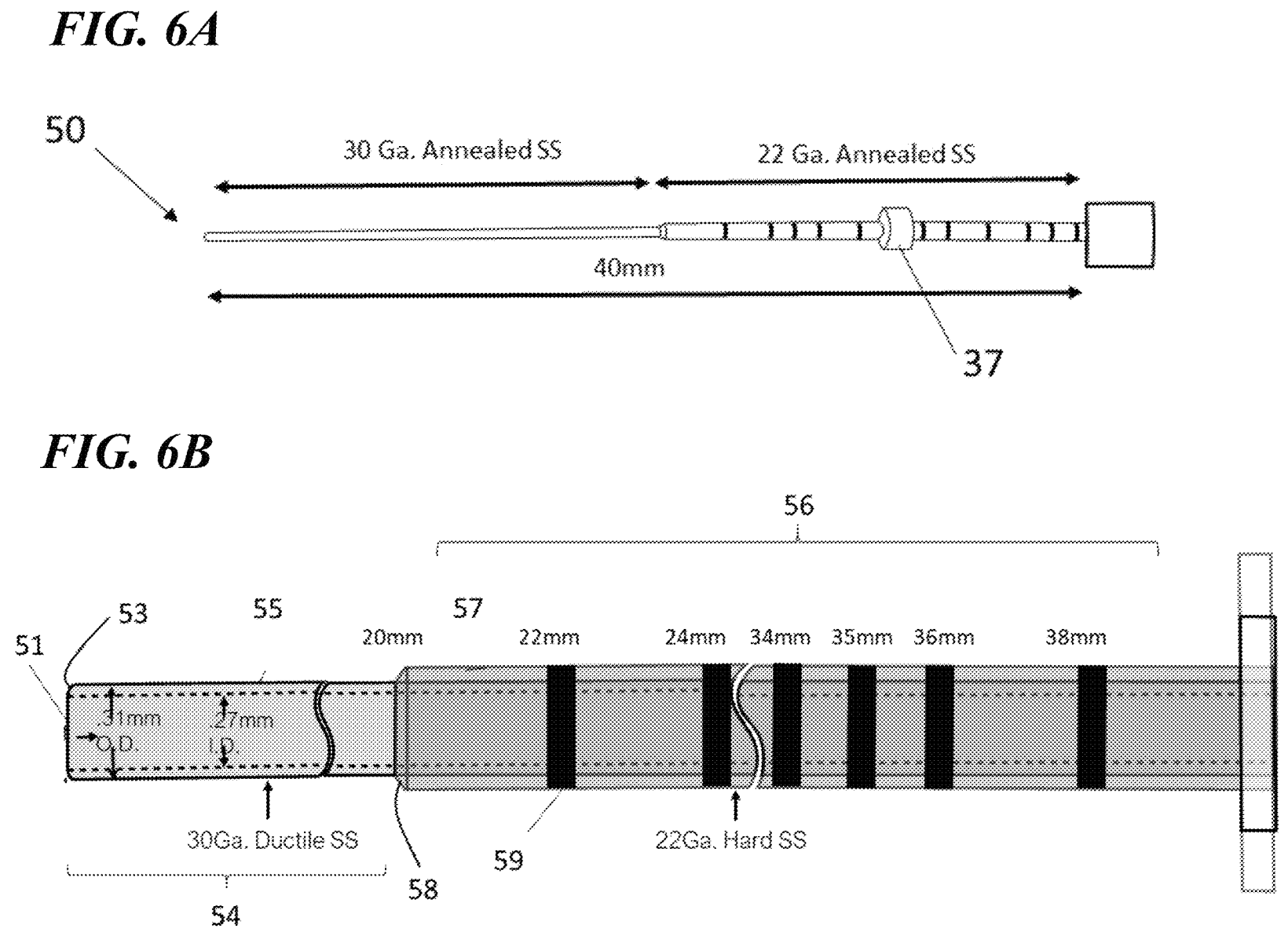

The gauge used for catheter 50 is important for effective fluid dynamics. In embodiments, the catheters 50 have a gauge size in a range of 29 to 31 and may be 30 gauge. Referring to FIGS. 6A & 6B, the catheters 50 may be thin walled catheters. For example, the catheter 50 may be a 30 gauge catheter having an ID of 0.27 mm and an OD of 0.31 mm. In embodiments, the catheters 50 include a blunt cut distal end 51 to better clean ahead of and behind their apical placement points in each of the canals, delivering a constant flow of irrigating solution to the ends of root canals drawn out the end 51 under vacuum. The catheters 50 have radiused edges 53 to help them glide around canal curves without scraping up dentin debris which could block the catheter 50.

By way of a non-limiting example, the catheter 50 may be 40 mm in length and made of 30 gauge, thin-wall, ductile (annealed, softer) stainless steel tubing 55, with a 22 gauge hard (tempered, harder) stainless steel over-tube 57 to stiffen the proximal half 56 (e.g. 20 mm) of the catheter 50. A portion 54 of the inner tubing 55 remains exposed beyond the end 58 of the over-tube 57. The tubing 55 may be extendable into and out of the over-tube 57. The over-tube 57 may include predetermined, spaced-apart bands 59 to help indicate length or depth.

Figure 9:
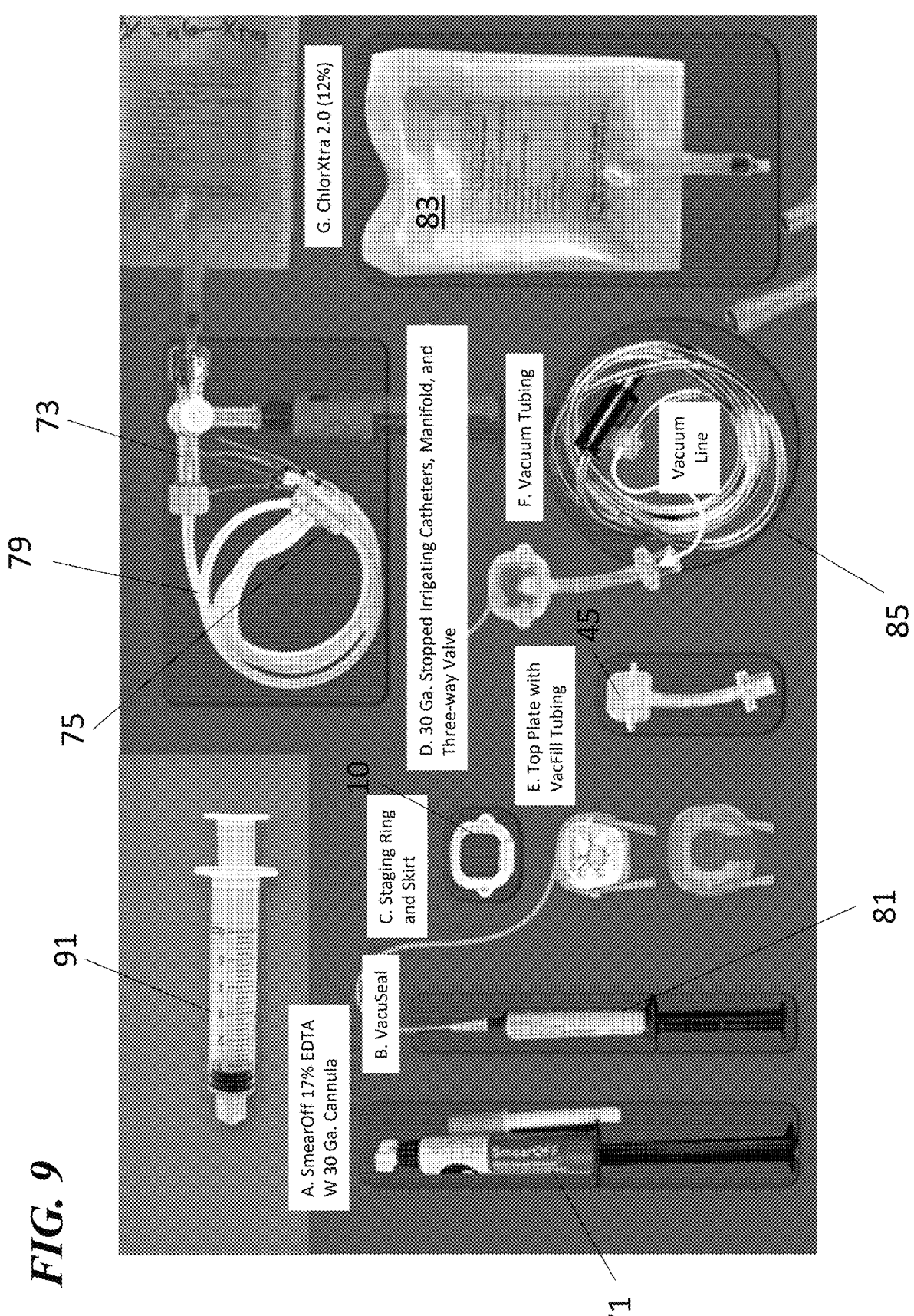
FIG. 9 is an embodiment of a kit for use in a system and method of this disclosure. By way of a non-limiting example, a single use sterile package may be provided that includes a staging assembly of this disclosure, a syringe with sealant, irrigating catheters with stops, a manifold and three-way valve, a top plate with associated tubing and luer connector, vacuum tubing, and an irrigant solution.
Figure 11A:
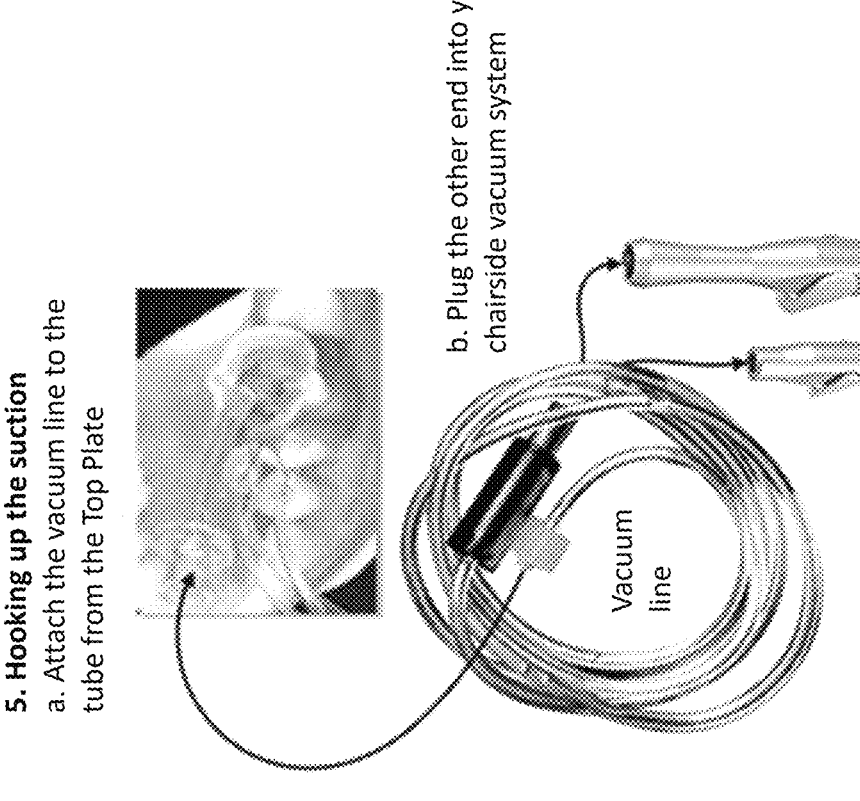

The irrigating solution delivered by the catheters 50 may be a dental fluid well known in the art such as sodium hypochlorite (NaOCl) or its equivalent. In embodiments, the anterior staging assembly 10 is connected to the irrigation solution by way of a manifold 75 with a single catheter line 79, the premolar staging assembly 10 is connected by way of the manifold 75 with two catheter lines 79, and the molar staging assembly 10 is connected by way of a manifold with four catheter lines. A three-way valve 73 is located between the source 83 of irrigating solution and the manifold 75. See e.g. FIG. 9.

In some embodiments, the irrigating solution may be heated above ambient room temperature (about 20° C. to 22° C.) in a range of about 5° C. to about 10° C. to increase the reaction rate of the NaOCl. The irrigating solution may include wetting agents like those found in CHLOR-XTRA™ or a NaOCl solution including fluorosurfactants, amine oxides, disulfonates or ethoxylated alcohols or mixtures thereof. The IV bag or container which contains the irrigating solution may have its bottom end positioned about 12 inches to 18 inches above the patient's head after the patient is placed in a correct position for the procedure.

Referring to FIGS. 7A to 8D, staging assembly 10 may also include a placement tool 60—if it is an incisor or premolar staging assembly 10—to center the staging assembly 10 on the access cavity. (The molar staging assembly 10 does not require a placement tool 60.) The placement tool 60 includes a handle 61 and a head 63 located at a distal end 65 of the handle 61. The head 63 is shaped complementary to the fenced-in area 47 of the staging assembly 10, and may include outrigger pegs 48. A tine 67 connected to the head 63 projects below the staging ring 13 and serves as the centering device. The placement tool 60 also makes it easier to hold the anterior and premolar staging assemblies 10 in place while the sealant is cured.

Referring now to FIGS. 9 to 12, in embodiments of a kit of this disclosure, the kit may include a syringe 71 with an irrigating tip and containing a 17% EDTA solution (e.g. a SMEAR-OFF™ syringe), a staging assembly 10, a staging placement tool 60 (pre-molar and anterior kits), vacuum tubing 85 that fits in saliva or high volume evacuator ("HVE") suction, an apex locator, a syringe 81 with a delivery tip and containing a light-cure polymer (e.g. VACUSEAL™ light-cured sealant syringe with a luer tip), an IV bag 83 containing a NaOCl solution (e.g. Chlor-XTRA™ Plus enhanced 8% NaOCl solution), an empty syringe 91 for aeration (e.g. a 6 cc or 12 cc syringe), and irrigant supply tubing 79 with a 1-, 2- or 4-catheter (manifold) assembly 75; and a bioceramic sealer. The kit may include all the sodium hypochlorite needed for anterior, premolar, and molar cases.

An irrigating solution like Chlor-XTRA™ Plus is superior to Clorox® bleach because it is about an 8% solution— important for soft tissue digestion—and it has buffers added to stabilize it during storage and shipping so it is full strength when the bag is first drawn from. There are also surfactants added to reduce surface tension of the solution against the dentin, allowing it to better penetrate dentinal tubules. This surfactant is also what creates the foam when air is injected and the bag is shaken.

In embodiments, a three-tooth slit rubber dam isolation stabilizes the staging assembly to extend the sealant onto adjacent marginal ridges and embrasures. If the clinician fails to thoroughly scrub the tooth with an alcohol cotton pellet before staging, it is difficult to achieve a predictable seal between the staging assembly and the tooth. For carious defects any missing walls must be excavated of all decay. Thoroughly scrub the excavated defect and adjacent interproximal tooth surface and rebuild the missing wall with the sealant. The inventors have found that traditional composite and glass ionomer doesn't work for this as they will not withstand vacuum pressures for several hours after curing. Rebuilding interproximal defects requires adjacent tooth to support sealant in defect.

The clinician should carefully wash and completely dry the tooth being treated as well as adjacent tooth surfaces. Any moisture on tooth structure before application prevents adequate adhesion of sealant to tooth structure. In embodiments, a two-step adhesion procedure may be used. First seal the rubber dam to the isolated teeth around their cervical perimeters, then wash, dry the dam and teeth again. Syringe sealant into MB, ML, DB, DL embrasures of the tooth in treatment, then around the buccal and lingual of the tooth, then over the contacts and onto the adjacent teeth. Finally, coat the lingual or occlusal surface with a layer of sealant that is about one mm thick. Cure the sealant.

Syringe sealant onto the underside of the staging skirt, being careful to avoid getting it on the placement pool positioning tine. In the case of anterior staging, place the staging assembly onto the lingual surface of the tooth, guided by the positioning tine on the placement tool, use the curing light to push the buccal staging skirt flap against the tooth and light it up. This will help stabilize the staging assembly on the tooth and provides room to cure each side for an effective time (e.g. 5 seconds). When it's time to remove the placement tool from the staging ring, it is best to hold the staging assembly against the tooth with a cotton plier as the placement tool is withdrawn.

Sometimes it can take a bit of wiggling to break the placement tool free of the sealant that flows underneath the staging skirt, when it has been adhered to the access cavity. If the sealant occludes the access cavity in any way, a diamond bur may be used to trim it without enlarging the access cavity. This completes the first procedural objective: attaching and sealing the staging assembly to the tooth. The assembly is now set up to hold catheter stops in place as they are placed and adjusted in position.

Thread the luer connector on the NaOCl IV bag onto the valve stem opposite the manifold line attached to the IV valve. Use a patient bib clip to hang the IV bag from the microscope arm, with the spout up when aerated solution is wanted, and spout down when onlly NaOCl fluid flow is desired. An empty syringe, which may be included in the kit, can be used to inject 2 to 4 syringefuls of air into the IV bag so the solution can be shaken to produce foam bubbles that can energize the irrigating fluid dynamics in the second half of the procedure To help position the catheters, a finishing file may be placed into each canal to read the length needed from catheter fence to ideal position in the canal, and transfer that length—minus 2 mm to 4 mm—to the actual catheter to be used in the procedure. Or, an apex locator of a kind known in the art can be used in canals with terminal diameters larger than 0.3 m. The apex locator probe contacts the shank of the catheter as it is positioned at the end of the canal. Adjust the catheter stop to the height of the catheter fence at the level of the stop holds. Take it out, measure it, subtract 2 to 3 mm, and push the catheter stop into one of the stop holds. The simplest cases rarely need catheter depth adjustment after the confirmatory radiograph. These catheter placements are almost always seen on the confirmatory radiograph in ideal position and there is never a doubt about adequate passive fluid flow around the end of the catheter. If the catheter is mistakenly placed to length or beyond, the vacuum will be cut off by the catheter end binding canal or soft tissue, thus immediately stopping any irrigant flow out the ends of catheters, so ideal placement is not a safety issue but rather an efficacy issue. Once the stop 37 is captured in its hold 36, the catheter 50 can be easily adjusted to an appropriate length.

In small canals an accessory catheter is used with the EDTA syringe to ideally position the catheters in canals. The challenge of catheter placement in small canals is to insert the catheter as deeply as possible without blocking the fluid path (e.g., within 3 to 5 mm from terminal length). Locking the catheter in the canal is not dangerous at all, it just reduces the efficacy of the irrigation in that specific canal. That is why the EDTA syringe is attached to the accessory catheter, to test for fluid flow after the catheter is placed to the binding point. Most often, the catheter binds around small canal curvatures, leaving adequate space for backwards fluid flow, which is essential for the irrigation effect of this disclosure. Blocking the canular escape path of fluid from the catheter is not at all dangerous, it just reduces or eliminates the efficacy of the irrigation in that specific canal. When catheters bind in small canals, they usually bind in the curvature, not circumferentially, leaving adequate space for backwards fluid flow around the ends of catheters.

Even when the blunt-cut tip ends bind circumferentially in the canal, it is common for an isthmus between canals to offer a coronal vent space, but the clinician needs a way to confirm this fluid flow at binding length. That is why the EDTA syringe can be attached to a test or accessory catheter, to test for fluid flow after the test catheter is placed to the binding point. When fluid flow is confirmed at binding length, the stop on the test catheter is positioned to enter the stop hold on the catheter fence, this test catheter is taken out, its length measured, that length is transferred to a treatment irrigating catheter. That treatment catheter is placed into the appropriate canal, and the stop is secured into the stop hold.

If fluid flow is blocked by the accessory catheter at its binding point in the canal, the catheter is pulled back 1 mm and fluid flow is checked again. This process continues until fluid flow is adequate. The stop can then be adjusted and the length transferred to the catheter to be used in that canal.

A radiograph is then taken to confirm adequacy of catheter placement in the canals. Adjust as required. When catheter position changes are needed, the clinician should not tug on the tubing but instead grasp the catheter with cotton pliers or a hemostat Ideally, the catheter end fits within 2 mm to 4 mm of full length in the canal while exhibiting optimal fluid flow. ENDO-BENDER pliers may be used to curve the ends of catheters can be helpful in these cases.

Once catheter placement and fluid flow has been confirmed, the top plate goes onto the staging ring and sealant is liberally used to lute it in place. A bead of sealant should be run around the outrigger pegs in their alignment sockets or leakage can occur. Scrub the tooth being treated and the adjacent teeth with one or two alcohol cotton pellets, wash and thoroughly dry the site.

Sealant can now be syringed around the cervical of the tooth being treated and then into the embrasures, over the contacts, the opposite side is coated, and the sealant is light-cured. The sealant base on the tooth is now complete. The inside of the staging skirt is coated without getting sealant on the positioning tine of the placement tool, it is placed onto the tooth, and is light-cured in place. Sealant should be added around the catheters as they exit the staging ring catheter fence. Any empty catheter opening in the fence should also be sealed. Cure the sealant.

The vacuum line can now be connected to port in in the top plate and the HVE or saliva ejector. Listen for suction noise around the Stage. If noise is heard, disattach the suction line, syringe sealant anywhere there might be a leak and, cure. Then hook up the vacuum again and listen. Embodiments of this disclosure can work with an air leak, so watch the catheter lines for fluid flow when deciding whether to intercede.

A final fluid flow check can now be done by threading on the EDTA syringe, turning the IV valve lever (which is always points to the off position) toward the IV bag so the line between EDTA syringe and the manifold/catheter is opened. Push and pull the plunger of the syringe to confirm that fluid flows both directions. EDTA is safe to syringe with positive pressure, but care is indicated if fluid isn't flowing adequately. When finished with this step, turn the IV valve toward the EDTA syringe and remove it.

As soon as the valve is turned to the middle position, NaOCl should immediately flow into the manifold, through the catheters, exiting the pulp chamber through the vacuum port line. When the procedure is complete, before removing the staging assembly and catheters, disconnect the patient end of the vacuum line from the vacuum port on top of the staging assembly and reconnect it to the center stem of the IV valve.

Now turn the IV valve tang toward the IV bag to shut off the NaOCl flow and apply vacuum pressure to the catheter manifold, to dry the canals. This only takes a half minute or so, continuing to monitor the vacuum line to see when fluid is no longer streaming back to chairside suction. Filler can no be applied through the port.

In embodiments of a method of this disclosure, the method includes:

1. Prepare canals. The clinician prepares canals, fits cones, and takes a radiograph. In embodiments, instrumentation may include a 17% EDTA solution
2. Attach and seal the staging ring and skirt to the tooth in treatment.
   a. Scrub the tooth with alcohol cotton pellets, or use an alcohol syringe with an infuser tip, to prevent the seal against the tooth being compromised by its salivary pellicle. One or two alcohol cotton pellets may be used, secured in a locking plier.
   b. Place an included tip on a syringe and lay a caulking rope of sealant over each contact area, into the embrasures, and across the buccal and lingual surfaces. The sealant should surround the perimeter or the occlusal surface. The sealant may be a light cured dental liquid dam/gingival barrier material,
   c. Place the staging ring and skirt over the tooth and into the sealant. Cotton pliers may be used for this purpose, the tines of the pliers fitting in the outrigger holes of the staging ring.

d. Light cure on all sides. In embodiments, light cure can be accomplished in about 20 seconds.

3. Place catheters.

a. Place each catheter to length into each canal, with the proximal end placed into a respective catheter slot of the staging ring and the distal end in a range of 2 mm to 5 mm from the terminus end of the canal. A rubber stop may be used to indicate an appropriate length of each catheter and secure each successive catheter in place before the next catheterPush the catheter stop into the stop hold, but once it is situated, the catheter can be easily adjusted to ideal length without the stop coming out of the stop hold.

b. After all catheters are in place, set the top plate outrigger pins into the staging ring holes and seal the top plate over the catheters to hold them in place.

c. Take a radiograph to confirm proper placement relative to the ends of the canals. Adjust the catheters where appropriate.

4. Seal the top plate to the staging ring using the sealer.

5. Attach the suction (after the sealant has cured to prevent leaks).

a. Connect one end of the vacuum (suction)/fill line to the tube of the top plate. In embodiments, the line may be 2 feet in length and connected to a luer connector of top plate vacuum line-out port.

b. Connect the other end of the line to a chair side vacuum system, either the high volume evacuator ("HVE") or the saliva suction valve.

6. Connect to the irrigant solution.

a. Draw back the plunger of an empty syringe (included in the kit), thread the syringe onto the luer connector of the IV bag containing the irrigant (e.g. sodium hypochlorite (NaOCl)), and inject the entire syringe of air into the bag. Shake the bag until all the air foams into solution inside the bag. By way of a non-limiting example, when two or three 12 cc syringefuls of air are injected into the bag or container of sodium hypochlorite, it allows the clinician to shake it up, in essence foaming it, a process enabled by any surfactants contained by the bag.

b. We do this because our research revealed that vacuum-drawing NaOCl foam through the tubing and out the ends of the irrigation catheters digests pulp replica at twice the rate as NaOCl without foam.

c. Connect the IV bag of irrigant to the one end of a two-way valve manifold (with the "OFF" valve lever pointed toward the irrigant bag).

7. Attach the EDTA syringe and flush the catheters and lines. With the valve turned OFF toward the IV bag, open the line between the ETDA syringe and the catheter manifold. Thread the EDTA syringe onto the middle valve stem, and syringe a small aliquot of EDTA through the lines, watching to see that fluids are flowing through each clear cannula mini-tubing, as well as seeing the vacuum line with fluids coursing back to the chairside vac.

8. Open valve to the irrigant. Turn the Valve lever to the middle position and irrigant should immediately start moving through the irrigant supply line to the cannula manifold.

9. Allow irrigant to clean the entire root canal system. Cleaning can be accomplished in a range of 10 minutes to 30 minutes depending on the tooth and canal geometry, there being subranges and discrete values within this broader range. With aerated, heated solution, as little as 10 minutes is needed to clean large anteriors or premolars. Small canals more often have lateral recesses between the canals so 15 minutes may be required. Molars have the widest isthmus spaces of all so, out of caution to ensure thorough cleaning, 20 to 30 minutes may be required. None of the clinician's time is needed after staging is completed.

10. Reverse the vacuum. After step 9 is finished, the valve is turned to shut off the irrigant, the EDTA syringe is removed, the vacuum line is detached from the top plate tubing connector and re-attached to the middle stem of the IV valve, which now draws a vacuum through the ends of the catheters, drying the root canal system. Drying may be accomplished in 10 to 15 seconds without paper points.

11. Fill the canal system. Once the vacuum has been reversed and the canal dried, sealer can be effectively placed into later canal reaches using a single bolus of sealer syringed into the pulp chamber. In embodiments, a bio-ceramic sealer is threaded onto the luer connector of the short tubing attached to the top plate and sealer is syringed into the pulp chamber until it escapes into the catheter lines. Escape typically occurs in one to two seconds.

12. Remove the stage with hemostats, rotating the entire setup off the tooth, pulling the catheters out of the canals. The removal of the catheters may leave a small linear void which can be eliminated by placement of gutta percha points. The gutta percha may be seared off with heat and condensed into the canal orifices.

13. Take a radiograph.

One of the biggest advantages of vacuum-drawn positive outflow irrigation is that it cleans 4 mm to 5 mm ahead of the catheter end. This means a clinician can adequately clean a 15-.03 minimally invasive endodontrc canal prep—which is 0.3 mm in diameter and 5 mm back from the apex—with a 30 gauge thin wall catheter that is 0.3 mm in outside diameter.

Tests of the System and Method

By way of an example, one of the co-inventors (Buchanan) treated a patient on emergency, used intra-osseous anesthesia, quickly used rotary negotiation files to length in three canals, placed a piece of sponge in the access and left it open. When the patient was seen three days later, on a pain scale of 10, she said her pain went from an 8 or 9 to a 5 where Buchanan had expected it to go down to a 1 or 2. This was so rare in Buchanan's experience that he was mystified as to the etiology for her continuing pain, until he had completed the case.

The distal canal had a mid-root bifurcation and the rotary negotiating files only traversed and extirpated the pulp from one of them. Because Buchanan was unaware of the DL canal, he had only instrumented the MB, ML, and DB canals. So, using a this case as a test to determine whether the system and method worked for its intended purpose, he set a second catheter to mid-root in that canal, ran it for 20 minutes, and then used it to fill the canal space with bio-ceramic sealer, followed by gutta percha points in the three canals. The prototype system and method cleaned and filled a 5 mm canal that had not had a single instrument used in it; cleaned and filled a 4 mm long accessory canal off the primary MB canal. Again, this was canal space with vital inflamed pulp tissue in it was untouched by a file, but was cleaned and filled by the r system of treatment.

Another test case with unusual anatomy had CBCT imaging which showed very close proximity to the mental nerve foramen. Buchanan cut a minimally invasive endodontic access cavity about 1.1 mm wide, figured initial canal length using the CBCT, used a single 18-.06 Traverse Rotary Negotiating File—to length—in about five cuts, gauged the terminal diameter with a #25 NTKF, cut a single 30-.05 MiniKut rotary file around the lingual curve in the canal, unaware of another canal with greater distal curves. Buchanan then hooked up a prototype embodiment and let it run for 15 minutes. A picture of the catheter at length showed it set 4 mm short of the root canal terminus (research in blocks showed that cleaning can occur 4 mm to 5 mm ahead of the catheter). The vacuum was reversed, and vacuum-drawn sealer was used to fill the canals, even before the gutta percha cone was placed and condensed. The result was an apical bifurcation. The bio-ceramic sealer is very bio-compatible. It either dissipates over month or two, or it sets up hard. In the inventors experience the bio-ceramic sealer never causes a problem, never goes anywhere.

In additional testing of the an embodiment of this disclosure, in one test a central canal was very calcified. Once the canal was found, it already had a decent sized passageway, so Buchanan cut a 25-.05 MiniKut File to length, it gauged at length with a #25 KF so that was all the instrumentation it needed. Buchanan then hooked up the prototype embodiment and ran it for 20 minutes, then filled the canal and four lateral canals. In another test, an immature central incisor belonging to a 9-year old boy was untouched by any files before Buchanan hooked up two catheters and ran the prototype for a full 20 minutes, leaving a perfectly clean canal.

Tests of the prototype in both research blocks and patient tooth structures showed:

The method of action is simple, without an electric cord of its own. Rather, it is powered by the chairside evac system;

There is no capital investment risk and no risk to patients;

There are no maintenance fees;

All staging gear, sealant, irrigants, and bio-ceramic sealer can be included in a single kit;

All canals in the tooth can be treated simultaneously;

Only 2-4 minutes of hands-on time is required;

Cleaning procedures take less than 20 minutes (large anterior and premolar canals about 10 minutes or less/50 ml of NaOCl; small anterior and premolar canals about 15 minutes or less/75 ml of NaOCl; molar canals about 20-30 minutes or less/100 ml of NaOCl);

It is a single use device: no cleanup, no infection control, no barriers;

Vacuum-drawn sodium hypochlorite is 100% safe;

Embodiments deliver CaOH-level disinfection in a single appointment; and

Obturation is very fast, capturing full apical and lateral extents of the root canal system with vacuum-drawn sealer propelled into the root canal system.

What is claimed:

1. A system for use in irrigation of a human tooth root canal system, the system comprising:
a staging assembly (10) including:
a staging skirt (11); and
a staging ring (13) adjacent, and connected to, the staging skirt;
the staging skirt made of a first material and flexible, the staging ring made of a second material and rigid;
the staging skirt further including flaps (12) defining a cavity (15) having a predetermined size for connection to a human tooth;
the staging ring further comprising:
a catheter fence (17) including, at a forward end, a plurality of spaced-apart catheter-slots (29);

wherein, the catheter fence defines an open, fenced-in area (47);
a top plate (45) sized for insertion into the open, fenced-in area of the catheter fence, the top plate including a port (49), wherein the top plate is located within the catheter fence rearward of the plurality of catheter slots and forms a single chamber containing at least one catheter when the at least one catheter is inserted into a corresponding one of the plurality of catheter slots;
wherein the system does not require an electrical source for operation.

2. The system of claim 1, further comprising:
the top plate including a pair of outrigger pegs (48);
the staging ring including a pair of alignment slots (39);
wherein when top plate is connected to the staging ring, the outrigger pegs reside in the alignment slots.

3. The system of claim 1, further comprising:
a vacuum line (46, 85) connected to the port of the top plate.

4. The system of claim 1, the at least one catheter being a thin-walled catheter (55) in range of 29 to 31 gauge and having a blunt cut end (51) with radiused edges (53), a proximal portion (56) of the thin-walled catheter being housed by a tube (57) having a different gauge and being harder than the thin-walled catheter.

5. The system of claim 1, further comprising, at least one syringe (71, 81) containing either a dental sealant including a light cure polymer, a liquid solution containing ethylenediaminetetraacetic acid, or a bio-ceramic.

6. The system of claim 5, further comprising a three-way valve (73), one end of the three-way valve connectable to a vacuum pump, another end of the three-way valve connectable to an IV bag containing an irrigant solution including sodium hypochlorite, and yet another end of the three-way valve connectable to the syringe.

7. The system of claim 1, further comprising;
an IV bag (83) containing an irrigant solution including sodium hypochlorite, the IV bag being connected to the at least one catheter.

8. The system of claim 1, further comprising a portion of the forward side of the catheter fence containing the plurality of catheter slots is oblique to the top plate.

9. A staging assembly (10) for use in irrigation of a human tooth root canal system, the staging assembly including:
a staging skirt (11); and
a staging ring (13) adjacent, and connected to, the staging skirt;
the staging skirt made of a first material having a first flexibility, the staging ring made of a second material having a second flexibility different from that of the first;
the staging skirt further including flaps (12) defining a cavity (15) having a predetermined size for connection to a human tooth;
the staging ring further comprising a catheter fence (17), the catheter fence including a plurality of spaced-apart catheter slots (29) located along a forward side of the catheter fence, the forward side having a greater height than a rearward side of the catheter fence, the catheter slots being open toward the rearward side of the catheter fence, the catheter fence defining an open, fenced-in area (47) between the forward and rearward sides; and
a top plate (45) including a vacuum/filling port (49) extending upwardly above the top plate, the top plate being rearward of the plurality of spaced-apart catheter slots and surrounded by the catheter fence, the vacuum/filling port (49) facing the forward side of the catheter fence;

the vacuum/filling port and the plurality of spaced-apart catheter slots being in communication with the open-fenced-in area.

10. The staging assembly of claim 9, further comprising:

the forward side of the catheter fence including a plurality of catheter stop holds; and at least one catheter (50), the at least one catheter including a catheter stop (37) sized for capture by a catheter stop hold of the plurality of catheter stop holds, the catheter stop being moveable along a length of the at least one catheter such that a single length of the at least one catheter can translate in or out of the open, fenced-in area of the catheter fence.

11. The staging assembly of claim 9, further comprising at least one catheter, the at least one catheter being a thin-walled catheter (55) in range of 29 to 31 gauge and having a blunt cut end (51) with radiused edges (53), a proximal portion (56) of the thin-walled catheter being housed by a tube (57) having a different gauge and being harder than the thin-walled catheter.

12. The staging assembly of claim 11, wherein the top plate forms a sealed single chamber containing the at least one catheter.

13. The staging assembly of claim 9, further comprising:

the top plate including a pair of outrigger pegs (48);

the staging ring including a pair of alignment slots (39);

wherein when top plate is connected to the staging ring, the outrigger pegs reside in the alignment slots.

14. The staging assembly of claim 9, further comprising:

a vacuum line (46, 85) connected to the vacuum/filling port of the top plate.

15. The staging device of claim 9, further comprising:

an IV bag (83) containing an irrigant solution including sodium hypochlorite, the IV bag being connected to the at least one catheter.

16. The staging device of claim 9, further comprising a portion of the forward side of the catheter fence containing the plurality of catheter slots is oblique to the top plate.

17. A staging assembly for use in irrigation of a human tooth root canal system, the staging assembly having only one port and only one chamber, the staging assembly comprising:

a staging skirt made of a first material and flexible and including flaps defining a cavity having a predetermined size for connection to a human tooth;

a staging ring made of a second material and rigid and located adjacent, and connected to, the staging skirt; the staging ring further comprising a catheter fence including, at a forward end, a plurality of spaced-apart catheter-slots, the catheter fence defining an open, fenced-in area;

a top plate located within the open, fenced in area rearward of the plurality of spaced-apart catheter slots, forming the only one chamber and including the only one port.

18. A method for irrigation of a root canal system of a human tooth using the staging assembly of claim 17, the method comprising:

luting the staging assembly onto a cavo surface of the human tooth after an access cavity to the root canal system has been prepared;

positioning, through the staging assembly, at least one single length catheter into a respective canal of the root canal system, the at least one single length catheter passing through one of the catheter slots of the staging assembly and into the root canal system, a distal end of the at least one single length catheter being in a range of 2 to 5 mm from an apical end a root canal of the root canal system, wherein the at least one single length catheter is adjustably held within the one catheter slots such that the at least one single length catheter can translate in or out of the one catheter slot for positioning within the root canal;

sealing the staging assembly to form a closed system consisting of the only one chamber;

connecting, to a three-way valve, the at least one single length catheter, a supply of irrigant solution containing sodium hypochlorite, and a syringe containing ethylenediaminetetraacetic acid;

attaching a vacuum line to the only one port of the staging assembly;

flushing the at least single length catheter with the ethylenediaminetetraacetic acid;

after the flushing, irrigating the root canal system by providing the irrigating solution through the at least one single length catheter, the irrigant solution being drawn out the ends of the at least one single length catheter by applying a vacuum to the vacuum line, the irrigating being in a range of 10 minutes to 30 minutes;

during the irrigating, evacuating the irrigant solution delivered by the at least one single length catheter along with tissue dissolved by the irrigant solution from the root canal system by the applying of the vacuum, the irrigating and the evacuating occurring continuously and simultaneously with one another;

after the irrigating and the evacuating, drying the root canal system by disconnecting the supply of irrigant solution from the three-way valve, removing the syringe containing the ethylenediaminetetraacetic acid from the valve, detaching the vacuum line from the staging assembly and connecting the vacuum line to the three-way valve; and applying a vacuum to the at least one single length catheter through the vacuum line;

wherein the method does not require a source of electrical power.

19. The method of claim 18, the at least one single length catheter is a thin-walled catheter in range of 29 to 31 gauge and having a blunt cut end with radiused edges, a proximal portion of the thin-walled catheter being housed by a tube having a different gauge and being harder than the thin-walled catheter.

20. The method of claim 18, wherein, the at least one single length catheter includes a catheter stop, the catheter stop being movable along a length of the at least one single length catheter, wherein the positioning includes moving the catheter stop along the length of the at least one single length catheter.

21. The method of claim 18, wherein, the top plate of the staging assembly includes a pair of outrigger pegs;

the staging ring of the staging assembly includes a pair of alignment slots;

wherein when top plate connected to the staging ring, the outrigger pegs reside in the alignment slots.

22. The method of claim 18, further comprising, aerating the irrigant solution, heating the irrigant solution, or aerating and heating the irrigant solution.

23. The method of claim 18, wherein, the luting includes first positioning the staging assembly onto the human tooth by way of a placement tool, the placement tool including a head shaped complementary to the open, fenced-in area of the staging ring and a tine that passes through the open, fenced-in area.

24. The method of claim 18, further comprising, after the drying, obturating the root canal system through the staging assembly by connecting a syringe containing a bio-ceramic filler to the three-way valve and syringing the bio-ceramic filler into a pulp chamber of the human tooth.

\* \* \* \* \*